United States Patent
Boyd et al.

(10) Patent No.: US 10,382,134 B2
(45) Date of Patent: Aug. 13, 2019

(54) CHANNEL BONDING FOR ETHERNET PASSIVE OPTICAL NETWORK OVER COAX (EPOC) NETWORKS

(71) Applicant: Avago Technologies International Sales Pte. Limited, Singapore (SG)

(72) Inventors: Edward Wayne Boyd, Petaluma, CA (US); Mark E. Laubach, Redwood City, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 63 days.

(21) Appl. No.: 15/172,600

(22) Filed: Jun. 3, 2016

(65) Prior Publication Data
US 2016/0285556 A1    Sep. 29, 2016

Related U.S. Application Data

(62) Division of application No. 13/974,823, filed on Aug. 23, 2013, now Pat. No. 9,369,206.
(Continued)

(51) Int. Cl.
*H04Q 11/00*    (2006.01)
*H04B 10/516*   (2013.01)
(Continued)

(52) U.S. Cl.
CPC .......... *H04B 10/27* (2013.01); *H04B 10/516* (2013.01); *H04L 5/0046* (2013.01);
(Continued)

(58) Field of Classification Search
CPC ... H04B 10/27; H04B 10/516; H04L 27/2627; H04L 27/26; H04L 5/0046; H04L 27/36; H04Q 11/0067
See application file for complete search history.

(56) References Cited

U.S. PATENT DOCUMENTS 7,362,704 B2 * 4/2008 Sisto .................. H04L 47/22
                                              370/230
7,693,429 B1    4/2010 Lowery
(Continued)

FOREIGN PATENT DOCUMENTS

CA     2 390 253       12/2002
EP     2 073 426 A2    6/2009
(Continued)

OTHER PUBLICATIONS

Mukherjee, B., "EPoC (Ethernet PON over Coax); Architecture, MPCP, and DBA," IEEE 802 Plenary Session (May 4, 2012).
(Continued)

*Primary Examiner* — Amritbir K Sandhu
(74) *Attorney, Agent, or Firm* — Sterne, Kessler, Goldstein & Fox P.L.L.C.

(57) ABSTRACT

Embodiments provide systems and methods for enabling the support of multiple Ethernet Passive Optical Network over Coax (EPoC) channels, which can be bonded together into a single high-speed channel. The multiple EPoC channels can be configured according to available spectrum, such that they occupy one or more, frequency contiguous or separated, segments of the available spectrum. The size (number of sub-carriers) of each of the channels can be configured according to embodiments based on the available spectrum and/or other requirements (e.g., EPoC emission requirements, existing services, etc.). Further, within each channel, individual sub-carriers can be configured independently, including turning each sub-carrier on/off and/or specifying the symbol bit loading for the sub-carrier independently of other sub-carriers in the channel.

18 Claims, 12 Drawing Sheets

Related U.S. Application Data

(60) Provisional application No. 61/693,179, filed on Aug. 24, 2012, provisional application No. 61/702,104, filed on Sep. 17, 2012, provisional application No. 61/702,113, filed on Sep. 17, 2012.

(51) Int. Cl.
  *H04B 10/27* (2013.01)
  *H04L 5/00* (2006.01)
  *H04L 27/26* (2006.01)
  *H04L 27/36* (2006.01)

(52) U.S. Cl.
  CPC .......... *H04L 27/2627* (2013.01); *H04L 27/36* (2013.01); *H04Q 11/0067* (2013.01)

(56) References Cited

U.S. PATENT DOCUMENTS

| | | | |
|---|---|---|---|
| 9,025,954 B2* | 5/2015 | Fang | H04L 12/2801 370/210 |
| 9,094,161 B2* | 7/2015 | Chen | H04L 5/0044 |
| 9,319,140 B2* | 4/2016 | Chen | H04B 10/27 |
| 9,319,759 B2* | 4/2016 | Chaffins | H04Q 11/0067 |
| 9,331,786 B2* | 5/2016 | Fang | H04Q 11/0067 |
| 9,369,206 B2* | 6/2016 | Boyd | H04B 10/27 |
| 10,110,979 B2* | 10/2018 | Kim | H04Q 11/0067 |
| 10,200,129 B2* | 2/2019 | Remein | H04B 10/50 |
| 10,230,481 B2* | 3/2019 | Chen | H04J 3/1658 |
| 2005/0047783 A1* | 3/2005 | Sisto | H04L 47/15 398/71 |
| 2005/0058135 A1* | 3/2005 | Sisto | H04L 47/22 370/395.2 |
| 2005/0243837 A1* | 11/2005 | Boyd | H04L 45/00 370/395.52 |
| 2006/0126505 A1* | 6/2006 | Denney | H04J 3/1694 370/229 |
| 2010/0027557 A1* | 2/2010 | McGarry | H04L 12/2867 370/431 |
| 2010/0027994 A1 | 2/2010 | Xu et al. | |
| 2010/0061470 A1 | 3/2010 | Wei et al. | |
| 2010/0104284 A1 | 4/2010 | Liu et al. | |
| 2010/0329683 A1 | 12/2010 | Liu | |
| 2011/0007731 A1 | 1/2011 | Tsatsanis et al. | |
| 2011/0058813 A1 | 3/2011 | Boyd et al. | |
| 2011/0154425 A1* | 6/2011 | Kim | H04N 21/2385 725/116 |
| 2011/0164491 A1* | 7/2011 | Ma | H04L 1/0003 370/210 |
| 2012/0213259 A1* | 8/2012 | Renken | H04N 7/17309 375/222 |
| 2012/0257893 A1* | 10/2012 | Boyd | H04L 12/2801 398/58 |
| 2012/0269234 A1 | 10/2012 | Zhang et al. | |
| 2013/0004155 A1* | 1/2013 | Liang | H04Q 11/0067 398/9 |
| 2013/0142515 A1 | 6/2013 | Chen et al. | |
| 2013/0202286 A1 | 8/2013 | Boyd et al. | |
| 2013/0202293 A1 | 8/2013 | Boyd et al. | |
| 2013/0202304 A1 | 8/2013 | Boyd et al. | |
| 2013/0236177 A1* | 9/2013 | Fang | H04L 12/2801 398/66 |
| 2013/0272703 A1 | 10/2013 | Fang et al. | |
| 2013/0322882 A1* | 12/2013 | Fang | H04J 3/1694 398/67 |
| 2014/0056586 A1 | 2/2014 | Boyd et al. | |
| 2014/0072304 A1 | 3/2014 | Boyd et al. | |
| 2014/0079102 A1* | 3/2014 | Kliger | H04L 5/0046 375/222 |
| 2014/0079399 A1 | 3/2014 | Goswami et al. | |
| 2014/0099113 A1 | 4/2014 | Fang et al. | |
| 2014/0133856 A1* | 5/2014 | Boyd | H04Q 11/0067 398/58 |
| 2014/0133859 A1 | 5/2014 | Fang et al. | |
| 2014/0140698 A1* | 5/2014 | Hajduczenia | H04Q 11/0067 398/58 |
| 2014/0178076 A1 | 6/2014 | Fang et al. | |
| 2014/0186041 A1* | 7/2014 | Shellhammer | H04Q 11/0071 398/79 |
| 2014/0199070 A1* | 7/2014 | Shellhammer | H04L 5/0046 398/66 |
| 2014/0199074 A1 | 7/2014 | Cho et al. | |
| 2014/0314418 A1 | 10/2014 | Sun et al. | |
| 2015/0256262 A1 | 9/2015 | Kliger et al. | |
| 2015/0256284 A1 | 9/2015 | Laubach et al. | |
| 2015/0288452 A1* | 10/2015 | Stupar | H04L 12/2885 398/58 |
| 2015/0326309 A1 | 11/2015 | Lanzone et al. | |
| 2015/0372871 A1 | 12/2015 | Zang | |
| 2017/0012731 A1* | 1/2017 | Luo | H04J 3/1694 |
| 2017/0026128 A1* | 1/2017 | Remein | H04L 69/08 |
| 2017/0070295 A1* | 3/2017 | Remein | H04B 10/50 |
| 2017/0155983 A1* | 6/2017 | Detwiler | H04B 10/27 |
| 2017/0223438 A1* | 8/2017 | Detwiler | H04Q 11/0067 |
| 2017/0244487 A1* | 8/2017 | Gao | H04B 10/27 |
| 2017/0324538 A1* | 11/2017 | Effenberger | H04J 3/0661 |
| 2018/0035183 A1* | 2/2018 | Kim | H04Q 11/0067 |

FOREIGN PATENT DOCUMENTS

| | | |
|---|---|---|
| EP | 2 624 588 A2 | 8/2013 |
| WO | WO 2013/134509 A1 | 9/2013 |

OTHER PUBLICATIONS

Stupar, P., et al., "EPoC Feature Matrix and Specification Impact," Qualcomm, IEEE (Nov. 2012).

Partial International Search Report directed toward related International Application No. PCT/US2013/056447, dated Nov. 13, 2013 from the European Patent Office, Rijswijk, The Netherlands; 7 pages.

International Search Report with Written Opinion directed toward related International Application No. PCT/US2013/056447, dated Feb. 21, 2014 from the European Patent Office, Rijswijk, The Netherlands; 16 pages.

International Preliminary Report on Patentability with Written Opinion dated Feb. 24, 2015, from the International Bureau of WIPO, Geneva, Switzerland; 10 pages.

* cited by examiner

US 10,382,134 B2

CHANNEL BONDING FOR ETHERNET PASSIVE OPTICAL NETWORK OVER COAX (EPOC) NETWORKS

CROSS-REFERENCE TO RELATED APPLICATION(S)

The present application is a divisional of U.S. patent application Ser. No. 13/974,823, filed Aug. 23, 2013, which claims the benefit of U.S. Provisional Application No. 61/693,179, filed Aug. 24, 2012, U.S. Provisional Application No. 61/702,104, filed Sep. 17, 2012, and U.S. Provisional Application No. 61/702,113, filed Sep. 17, 2012, all of which are incorporated herein by reference in their entireties.

BACKGROUND

Technical Field

The present disclosure relates generally to Ethernet Passive Optical Network over Coax (EPoC).

Background Art

Increasing demand for bandwidth to support today's digital services requires that Ethernet Passive Optical Network over Coax (EPoC) services be flexible enough to exist anywhere in a cable plant that is operational today (as well as in any future plant upgrades that shift frequency spectrum use and/or enable additional spectrum) and to coexist with existing services. This includes the flexibility to have EPoC support multiple channels placed in different areas of the overall radio frequency (RF) spectrum with a fine placement granularity (e.g., 1 MHz).

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 1:
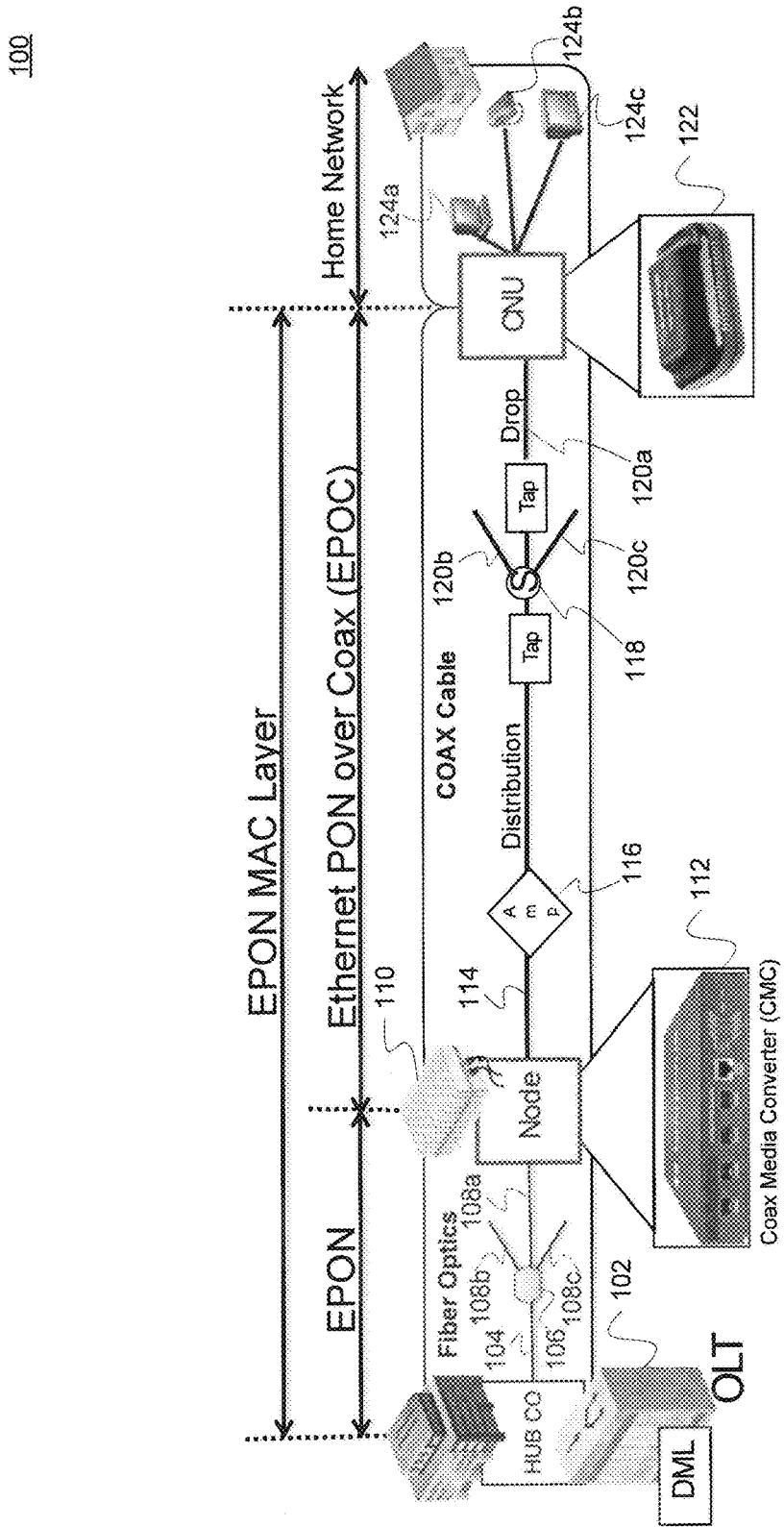
FIG. 1 illustrates an example hybrid Ethernet Passive Optical Network (EPON)—Ethernet Passive Optical Network Over Coax (EPoC) network architecture according to an embodiment.

FIG. 1 illustrates an example hybrid Ethernet Passive Optical Network (EPON)—Ethernet Passive Optical Network Over Coax (EPoC) network architecture 100 according to an embodiment. Example network architecture 100 is provided for the purpose of illustration only and is not limiting of embodiments. As shown in FIG. 1, example network architecture 100 includes an Optical Line Terminal (OLT) 102, an optional optical passive splitter 106, a communications node 110 including a coaxial media converter (CMC), an optional amplifier 116, an optional coaxial splitter 118, a coaxial network unit (CNU) 122, and a plurality of subscriber media devices 124.

OLT 102 sits at a central office (CO) of the network and is coupled to a fiber optic line 104. OLT 102 may implement a DOCSIS (Data Over Cable Service Interface Specification) Mediation Layer (DML) which allows OLT 102 to provide DOCSIS provisioning and management of network components (e.g., CMC, CMU, Optical Network Unit (ONU)). Additionally or alternatively, OLT 102 implements an EPON Media Access Control (MAC) layer (e.g., IEEE 802.3ah).

Optionally, passive splitter 106 can be used to split fiber optic line 104 into a plurality of fiber optic lines 108. This allows multiple subscribers in different geographical areas to be served by the same OLT 102 in a point-to-multipoint topology.

Communications node 110 serves as a bridge between the EPON side and the EPoC side of the network. Accordingly, node 110 is coupled from the EPON side of the network to a fiber optic line 108a, and from the EPoC side of the network to a coaxial cable 114. In an embodiment, communications node 110 includes a coaxial media converter (CMC) 112 that allows EPON to EPoC (and vice versa) bridging and conversion. In another embodiment, CMC 112 includes a Coaxial Line Terminal (CLT).

CMC 112 performs physical layer (PHY) conversion from EPON to EPoC, and vice versa. In an embodiment, CMC 112 is implemented as described in U.S. application Ser. No. 12/878,643, filed Sep. 9, 2010, which is incorporated herein by reference in its entirety. In an embodiment, CMC 112 includes a first interface (not shown in FIG. 1), coupled to fiber optic line 108, configured to receive a first optical signal from OLT 102 and generate a first bit stream having a first physical layer (PHY) encoding. In an embodiment, the first PHY encoding is EPON PHY encoding. CMC 112 also includes a PHY conversion module (not shown in FIG. 1), coupled to the first interface, configured to perform PHY layer conversion of the first bit stream to generate a second bit stream having a second PHY encoding. In an embodiment, the second PHY encoding is EPoC PHY encoding. Furthermore, CMC 112 includes a second interface (not shown in FIG. 1), coupled to the PHY conversion module and to coaxial cable 114, configured to generate a first radio frequency (RF) signal from the second bit stream and to transmit the first RF signal over coaxial cable 114. As would be understood by a person of skill in the art based on the teachings herein, embodiments do not require that a CMC be present. Additional network architectures in which can be used are further described below with references to FIGS. 2, 8A, 8B, and 8C, for example.

In EPoC to EPON conversion (i.e., in upstream communication), the second interface of CMC 112 is configured to receive a second RF signal from CNU 122 and generate a third bit stream therefrom having the second PHY encoding (e.g., EPoC PHY encoding). The PHY conversion module of CMC 112 is configured to perform PHY layer conversion of the third bit stream to generate a fourth bit stream having the first PHY encoding (e.g., EPON PHY encoding). Subsequently, the first interface of CMC 112 is configured to generate a second optical signal from the fourth bit stream and to transmit the second optical signal to OLT 102 over fiber optic line 108.

Optionally, an amplifier 116 and a second splitter 118 can be placed in the path between communications node 110 and CNU 122. Amplifier 116 amplifies the RF signal over coaxial cable 114 before splitting by second splitter 118. Second splitter 118 splits coaxial cable 114 into a plurality of coaxial cables 120, to allow service over coaxial cables of several subscribers (CNUs) which can be within same or different geographic vicinities.

CNU 122 generally sits at the subscriber end of the network. In an embodiment, CNU 122 implements an EPON MAC layer, and thus terminates an end-to-end EPON MAC link with OLT 102. Accordingly, CMC 112 enables end-to-end provisioning, management, and Quality of Service (QoS) functions between OLT 102 and CNU 122. CNU 122 also provides GigE (Gigabit Ethernet) and 100M Ethernet ports to connect subscriber media devices 124 to the network. Additionally, CNU 122 enables gateway integration for various services, including VOIP (Voice-Over-IP), MoCA (Multimedia over Coax Alliance), HPNA (Home Phoneline Networking Alliance), Wi-Fi (Wi-Fi Alliance), etc. At the physical layer, CNU 122 may perform physical layer conversion from coaxial to another medium, while retaining the EPON MAC layer.

Figure 8A:
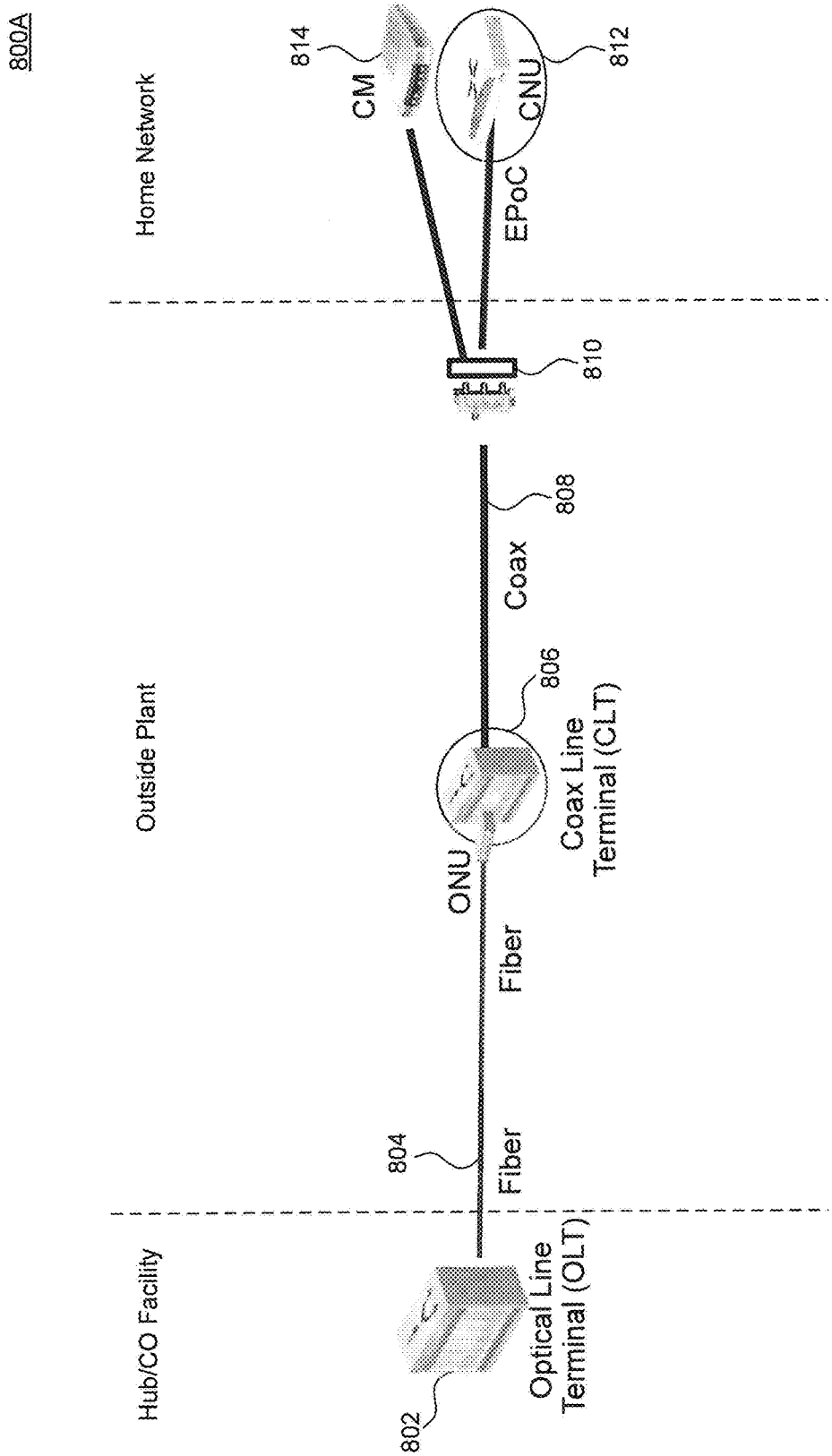
FIGS. 8A-8C illustrate examples of coaxial cable deployment topologies according to embodiments.
Figure 8B:
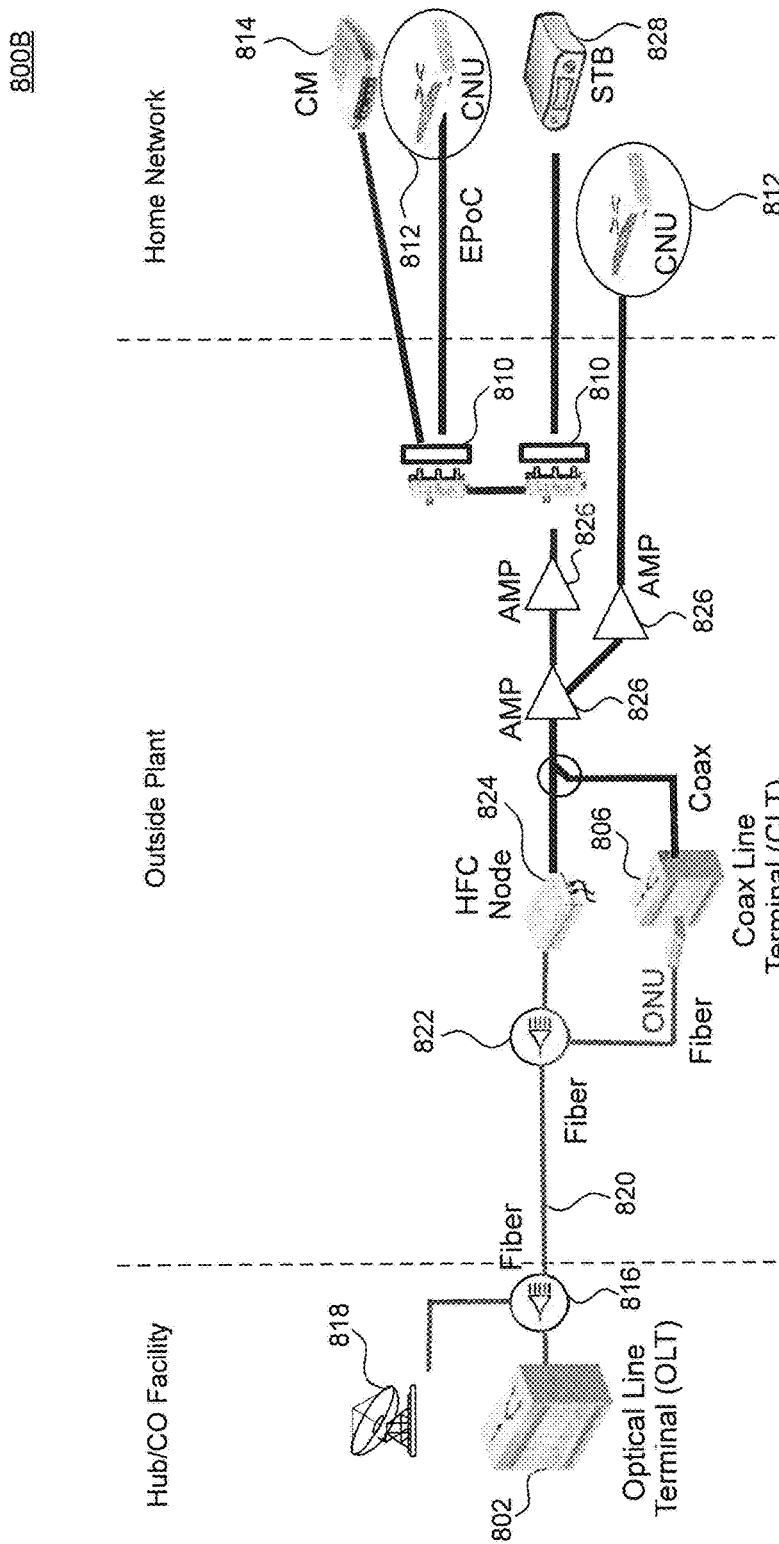
Figure 8C:
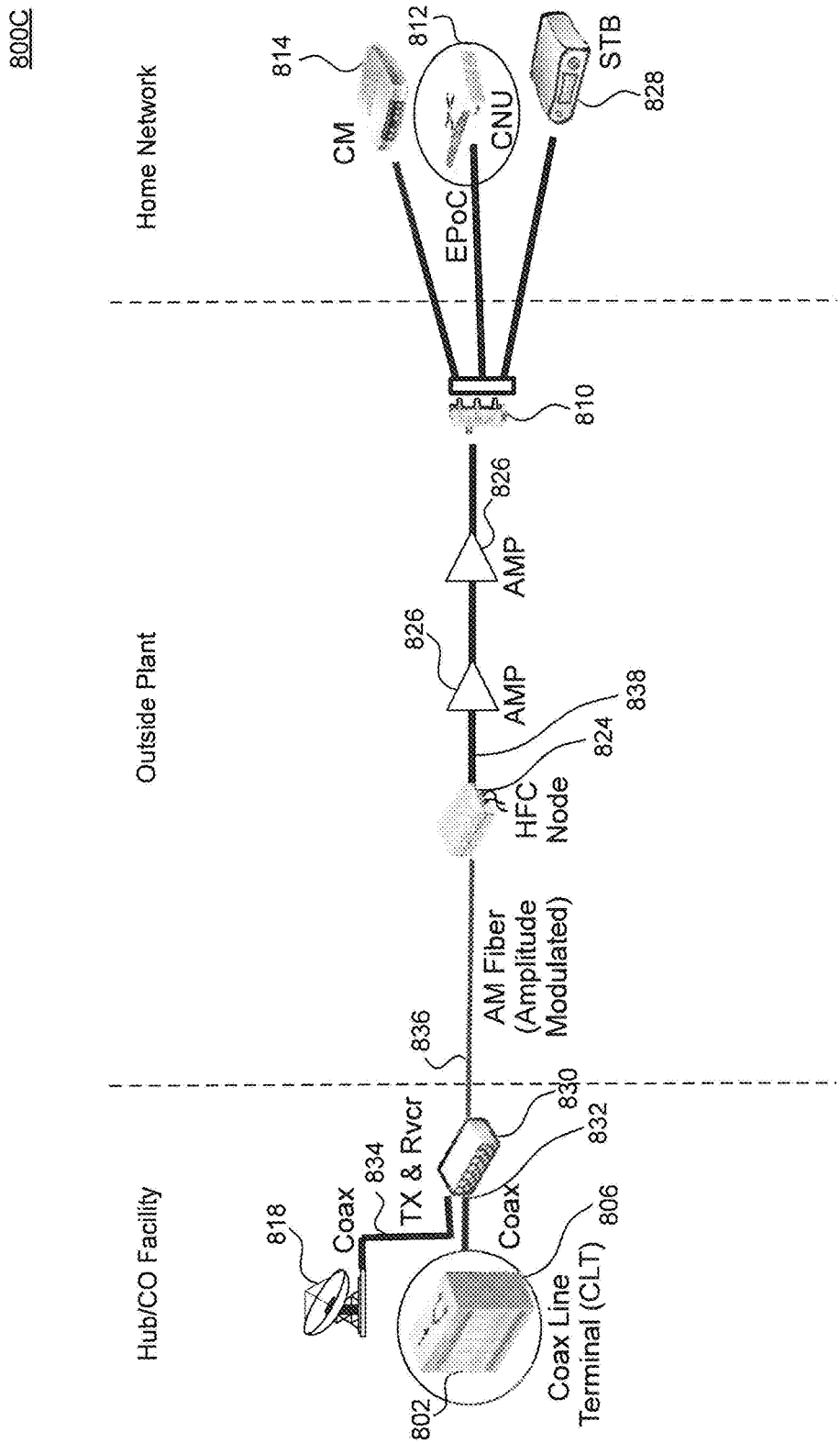

According to embodiments, EPON-EPoC conversion can occur anywhere in the path between OLT 102 and CNU 122 to provide various service configurations according to the services needed or infrastructure available to the network. For example, CMC 112 (including the CLT inside CMC 112), instead of being integrated within node 110, can be integrated within OLT 102, within amplifier 116, or in an Optical Network Unit (ONU) located between OLT 102 and CNU 122 (not shown in FIG. 1). FIGS. 8A, 8B, and 8C provide additional coaxial cable deployment topologies in which embodiments described herein can be used. In FIG. 8A, network architecture 800A includes an OLT 802, coupled via a fiber optic line 804, to a CLT 806, which includes an ONU. CLT 806 is coupled via a coaxial cable 808, and an intervening splitter 810, to a CNU 812 and a cable modem (CM) 814. in FIG. 8B, network architecture 800B includes an OLT 802, coupled via a fiber optic line 820 and intervening optical splitters 816 and 822, to a CLT 806 and a Hybrid Fiber Coax (HFC) node 824. Via splitter 816, OLT 802 can also connect to a Cable TV (CATV) services station 818. Either of HFC node 824 or CLT 806 can be used to connect over coax to CNUs 812, a CM 814, and Set Top Box (STB) 828. Intervening amplifiers 826 and splitters 810 can be present in the coaxial distribution network. In FIG. 8C, network architecture 800C includes a CLT 806, coupled via a coaxial cable to a TX/RX 830. TX/RX 830 can connect to a CATV services station 818 via a coaxial cable 834. Additionally, TX/RX 830 can connect via a fiber optic line 836 (e.g., amplitude modulated fiber) to a HFC node 824. HFC node 824 converts from optical to coaxial and enables CLT 806 to connect to a CNU 812, a CM 814, and a STB 828. Intervening amplifiers 826 and a splitter 810 can be present in the coaxial distribution network.

Figure 2:
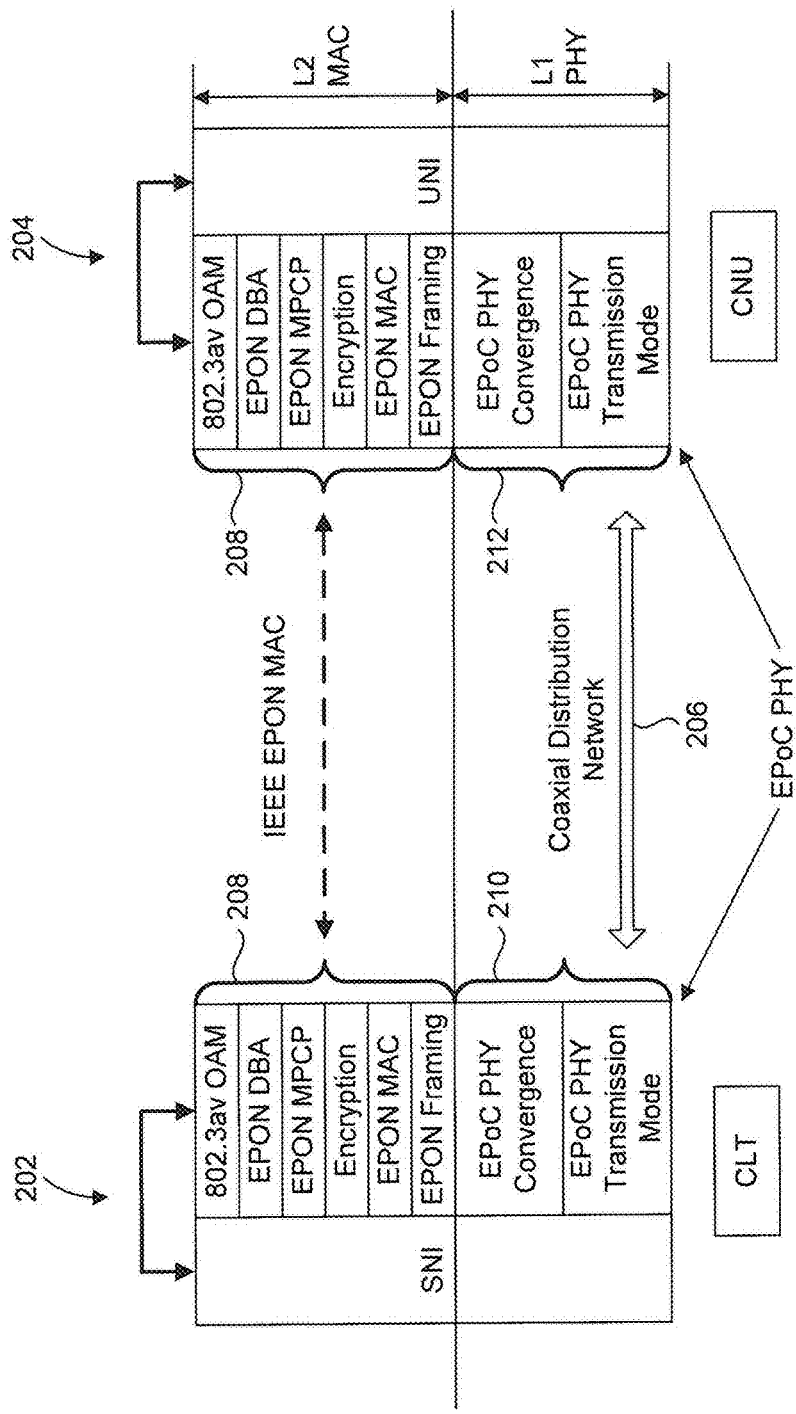
FIG. 2 illustrates an example EPoC network architecture according to an embodiment.

Returning to FIG. 1, in other embodiments, the end-to-end distribution network from OLT 102 to CNU 122 is coaxial only, rendering example network architecture 100 a pure EPoC network. In such embodiments, the OLT is referred to as a Coaxial Line Terminal (CLT). FIG. 2 illustrates an example EPoC network architecture 200 according to an embodiment. Example EPoC network architecture 200 is provided for the purpose of illustration only and is not limiting of embodiments.

As shown in FIG. 2, example EPoC network architecture 200 includes a CLT 202 and a CNU 204, coupled via a coaxial distribution network 206. Coaxial distribution network 206 can include a coaxial cable and optionally other coaxial components (e.g., splitters, amplifiers, etc.). As would be understood by a person of skill in the art based on the teachings herein, CLT 202 can serve multiple CNUs, such as CNU 204, in a point-to-multipoint topology.

Both CLT 202 and CNU 204 implement sub-layers 208 of an EPON MAC layer as defined by the IEEE 802.3ah standard, for example. These can include an EPON framing sub-layer, an EPON MAC sub-layer, an encryption sub-layer, an EPON Multi-Point Control Protocol (MPCP) sub-layer, and EPON Dynamic Bandwidth Allocation (DBA) sub-layer, and an 803.3av Operations, Administration and Maintenance (OAM) sub-layer. As such, an end-to-end EPON MAC link can be established between CLT 202 and CNU 204.

Transparent to the EPON MAC layers, CLT 202 and CNU 204 implement EPoC PHY layers 210 and 212 respectively. In an embodiment, EPoC PHY layer 210 includes a service provider EPoC PHY layer and EPoC PHY layer 212 includes a subscriber EPoC PHY layer. In an embodiment, EPoC PHY layers 210 and 212 include common PHY sub-layers, including an EPoC PHY Transmission Mode sub-layer and an EPoC PHY Convergence layer, which can be used to establish an EPoC PHY link between CLT 202 and CNU 204. EPoC PHY layers 210 and 212 can also include different respective PHY sub-layers tailored for their roles as service provider and subscriber respectively.

Increasing demand for bandwidth to support today's digital services requires that EPoC services be flexible enough to exist anywhere in a cable plant that is operational today (as well as in any future plant upgrades that shift frequency spectrum use and/or enable additional spectrum) and to coexist with existing services (e.g., video, DOCSIS, etc.). This includes the flexibility to have EPoC support multiple channels placed in different areas of the overall radio frequency (RF) spectrum with a fine placement granularity (e.g., 1 MHz). The channels (which may be in the downstream and/or the upstream) should be bonded together to act as single high-speed channel. Furthermore, it is desirable to have the ability to turn off or "null" one or more EPoC sub-carriers in a channel as determined by a cable operator. This ability can serve three significant purposes: 1) enable the tailoring of the overall size and placement of an EPoC channel within the RF spectrum allocated to EPoC by the cable operator; 2) reduce the energy emitted by EPoC that may interfere with existing (e.g., video, DOCSIS, etc.) nearby services; and 3) control the placement of energy in the RF spectrum consistent with EPoC channel emissions and/or susceptibility requirements imposed by the cable operator.

Embodiments of the present disclosure, as further described below, provide systems and methods for enabling the support of multiple EPoC channels, which can be bonded together into a single high-speed channel. The multiple EPoC channels can be configured according to available spectrum, such that they occupy one or more, frequency contiguous or separated, segments of the available spectrum. The size (number of sub-carriers) of each of the channels can be configured according to embodiments based on the available spectrum and/or other requirements (e.g., EPoC emission requirements, existing services, etc.). Further, within each channel, individual sub-carriers can be configured independently, including turning each sub-carrier on/off and/or specifying the symbol bit loading for the sub-carrier independently of other sub-carriers in the channel.

Figure 3:
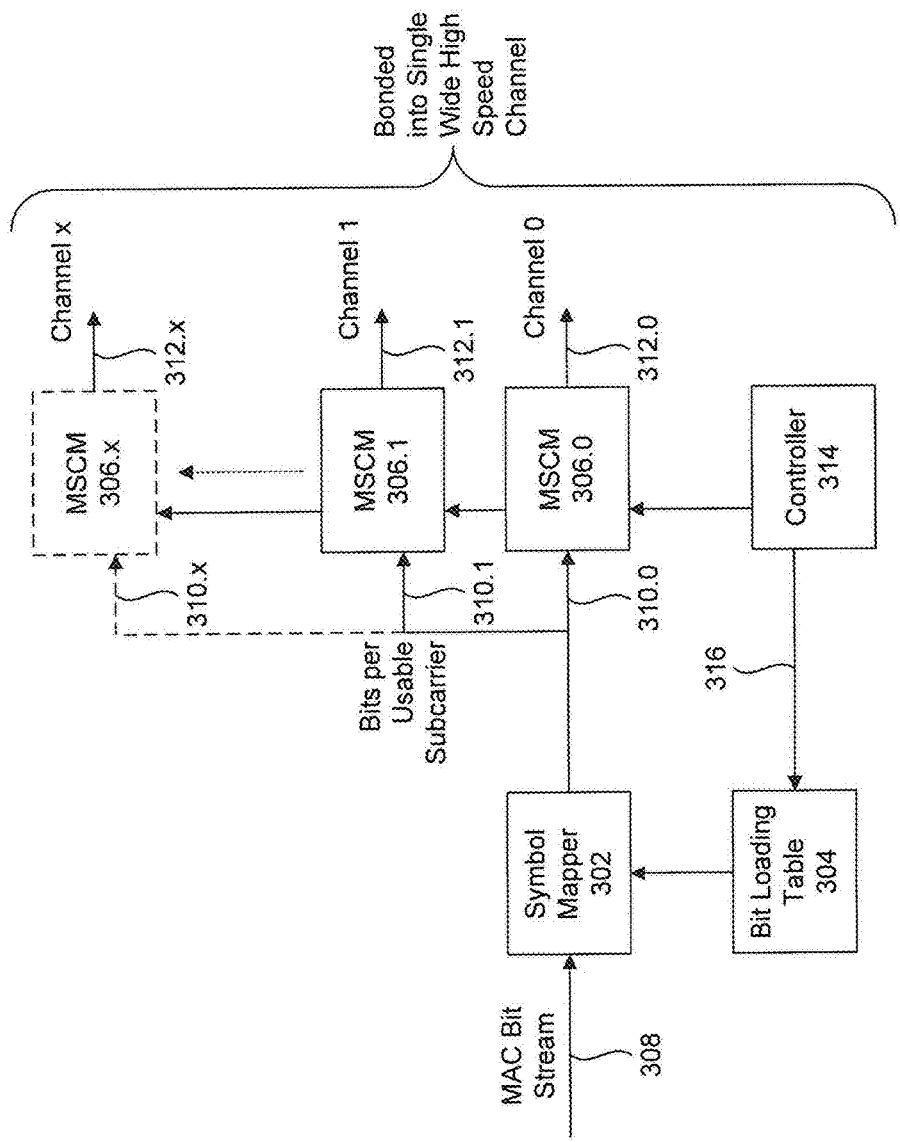
FIG. 3 illustrates an example EPoC physical layer (PHY) transmitter according to an embodiment.

FIG. 3 illustrates an example EPoC physical layer (PHY) transmitter 300 according to an embodiment. Example EPoC PHY transmitter 300 is provided for the purpose of illustration only and is not limiting of embodiments. Example EPoC PHY transmitter 300 can be located in a CLT, such as CLT 202, in a CNU, such as CNU 122 or 204, or in a CMC, such as CMC 112, for example. Example EPoC PHY transmitter 300 can be used to generate and bond multiple EPoC channels (in the upstream or downstream) to result in a single high-speed channel. As shown in FIG. 3, example EPoC PHY transmitter 300 includes, among other components, a symbol mapper 302, a bit loading table 304, and a plurality of multi-subcarrier modulators (MSCMs) 306.0, . . . , 306.x.

MSCMs 306.0, . . . , 306.x are associated with respective channels (or bands) 0, 1, . . . , x, each formed by a collection (subset) of sub-carriers of a plurality of available sub-carriers. The collections of sub-carriers that respectively form the channels 0, 1, . . . , x are non-overlapping and can be adjacent or separated in frequency. In an embodiment, each channel has a maximum usable RF spectral bandwidth (e.g., 192 MHz) and can be positioned independently in frequency from the other channels.

Frequency placement of channels can be managed by cable operator provisioning. For example, in an embodiment, EPoC PHY transmitter 300 includes a controller 314, which can be used to adjust the placement as well as the respective subset of sub-carriers for a given channel 0, 1, . . . , x. Adjustment of the sub-carriers of a channel can include adding or subtracting sub-carriers from the channel, changing the use of individual sub-carriers (e.g., used/unused, used for data, used for pilot, on/off), and/or changing the frequency widths of individual sub-carriers.

In an embodiment, within each channel, the sub-carriers share an orthogonal relationship whereby adjacent subcarriers require no frequency guard band. In another embodiment, sub-carriers have a frequency width of 25 KHz, resulting in 7680 usable sub-carriers in a 192 MHz channel. However, other frequency widths can be used in other embodiments, including different frequency widths among sub-carriers.

Bit loading table 304 contains symbol bit loading information for each sub-carrier of every channel 0, 1, . . . , x. The symbol bit loading for a sub-carrier indicates a number of data (e.g., MAC) bits that can be loaded into the sub-carrier in a symbol time. The symbol time represents the time domain unit of transmission for EPoC PHY transmitter 300. In the case of Orthogonal Frequency Division Multiplexing (OFDM), the symbol bit loading for a sub-carrier can be between 1 and 12 bits.

In an embodiment, controller 314 can be used to provision or update bit loading table 304 via a control signal 316. For example, controller 314 can be used to set the symbol bit loading for available sub-carriers at system start up and to adapt the symbol bit loading for a sub-carrier at a later time. In an embodiment, the symbol bit loading for a sub-carrier can be adapted responsive to a communication channel condition (e.g., signal-to-noise ratio (SNR), bit error rate, interference, etc.) associated with the sub-carrier.

When EPoC PHY transmitter 300 is located in a CLT, controller 314 can be used to set the symbol bit loading for sub-carriers used for downstream communication to CNUs connected to the CLT. Symbol bit loading for sub-carriers used for upstream communication from the CNUs to the CLT can either be signaled from the CLT to the CNUs, which then provision their respective bit loading tables accordingly, or determined by the CNUs independent of the CLT.

In an embodiment, bit loading table 304 can be represented by a 1-octet value for each sub-carrier of the corresponding channel as illustrated below in Table 1. The 1-octet value for each sub-carrier includes an X-bit, an M-bit, two reserved bits, and a 4-bit Subcarrier Bit Loading (SBL) field. The X-bit determines whether the sub-carrier is used or not used (i.e., turned off). The M-bit determines whether the sub-carrier is used to transport MAC data or not (e.g., pilot data). In an embodiment, if the sub-carrier is used to transport MAC data, then the sub-carrier is loaded per the symbol bit loading contained in bit loading table 304. Otherwise, the sub-carrier is loaded independent of bit loading table 304 (e.g., if the sub-carrier is used for pilot bits, a pre-defined pilot symbol bit loading can be used. For example, a pre-defined pilot symbol bit loading can include one used by the receiver for symbol clock alignment, channel estimation, etc. This can include BPSK or QAM, for example. The 4-bit SBL field contains the symbol bit loading for the sub-carrier. In an embodiment, the symbol bit loading can be between 0 and 12. A symbol bit loading of 0 indicates the presence of un-modulated energy on the sub-carrier.

TABLE 1

| Name | Bits | Function | Description |
| --- | --- | --- | --- |
| X-bit | 1 | X-bit (C, n, s) | Use bit. Indicates if the subcarrier is used or not-used (i.e., off, no energy). X = 0 not-used X = 1 used, useable |
| M-bit | 1 | M-bit (C, n, s) | MAC data. Indicates that MAC data is mapped to this subcarrier using the Bit per Symbol loading value. M = 1 used for MAC data M = 0 not used for MAC data |
| Reserved | 2 | | Set to "00" |
| Subcarrier Bit Loading | 4 | SBL (C, n, s) | Subcarrier bit-loading encoded as 4-bit unsigned integer. Bit per Symbol Loading 0 (un-modulated, energy present) 1 2 3 |

TABLE 1-continued

| Name | Bits | Function | Description |
|------|------|----------|-------------|
|      |      |          | 4           |
|      |      |          | 5           |
|      |      |          | 6           |
|      |      |          | 7           |
|      |      |          | 8           |
|      |      |          | 9           |
|      |      |          | 10          |
|      |      |          | 11          |
|      |      |          | 12          |
|      |      |          | 13-15 reserved |

In an embodiment, symbol mapper 302 is configured to receive a bit stream 308 from the MAC layer overlying EPoC PHY transmitter 300. The MAC layer can be an EPON MAC layer, such as EPON MAC layer 208 described above in FIG. 2. Bit stream 308 can be a serial or a parallel bit stream containing user data (e.g., Ethernet MAC frames). In another embodiment, bit stream 308 undergoes some processing (e.g., interleaving, forward error correction (FEC) processing, etc.) before reaching symbol mapper 302.

In each symbol time, symbol mapper 302 is configured to assign zero or more bits of bit stream 308 to each sub-carrier of every channel 0, 1, . . . , x based on the respective bit loading for the sub-carrier indicated in bit loading table 304. In an embodiment, for each sub-carrier of every channel 0, 1, . . . , x, symbol mapper 302 is configured to examine the X-bit of the sub-carrier from bit loading table 304 to determine whether or not the sub-carrier is used. If the sub-carrier is not used, symbol mapper 302 assigns zero bits of bit stream 308 to the sub-carrier. Otherwise, if the sub-carrier is used, symbol mapper 302 examines the M-bit of the sub-carrier to determine whether or not the sub-carrier is reserved for data (e.g., MAC data). If the sub-carrier is reserved for data and the symbol bit loading of the sub-carrier is greater than zero, symbol mapper 302 assigns one or more bits of bit stream 308 to the sub-carrier based on the SBL field of the sub-carrier in bit loading table 304. Otherwise, if the sub-carrier is not reserved for data, symbol mapper 302 assigns zero bits of bit stream 308 to the sub-carrier.

For the purposes of facilitating the presentation of embodiments herein, symbol mapper 302 is described herein as performing a linear or sequential transfer of bits from bit stream 308 to individual subcarriers as specified by bit loading table 304. One of skill in the art will appreciate however, based on the teachings herein, that a linear sequential method can be replaced or augmented by a pseudo-random application of bits from bit stream 308 across all available subcarriers, such that the same symbol filling objective is achieved but also other objectives such as robustness of the channel error performance in the presence of impairments. Such pseudo-random sequencing can also be referred to as randomizing or scrambling and require that the transmitter and receiver share the same pseudo-random knowledge. With the inclusion of this pseudo-randomization, symbol mapper 302 can also be referred to as a randomizer and symbol mapper. The same pseudo-randomization can also be used in step 724 of process 700 described below with reference to FIG. 7.

In an embodiment, as shown in FIG. 3, symbol mapper 302 generates a plurality of outputs 310.0, 310.1, . . . , 310.x for MSCMs 306.0, 306.1, . . . , 306.x respectively. Each output 310.0, . . . , 310.x includes in parallel the bits to be loaded in each sub-carrier of the channel 0, 1, . . . , x associated with the corresponding MSCM 306.0, 306.1, . . . , 306.x.

MSCMs 306.0, . . . , 306.x are configured to modulate their associated channels 0, 1, . . . , x to generate a plurality of respective multi-subcarrier modulated signals 312.0, 312.1, . . . , 312.x. In an embodiment, MSCMs 306.0, . . . , 306.x modulate their associated channels simultaneously such that multi-subcarrier modulated signals 312.0, 312.1, . . . , 312.x for the current symbol time are output simultaneously. In an embodiment, a combiner (not shown in FIG. 3) combines multi-subcarrier modulated signals 312.0, 312.1, . . . , 312.x to generate a multi-channel bonded signal. The multi-channel bonded signal can be transmitted over the frequency spectrum associated with the channels 0, 1, . . . , x.

In an embodiment, each of MSCMs 306.0, 306.1, . . . , 306.x is configured to simultaneously modulate independently the sub-carriers (all the sub-carriers are modulated at the same time but independent of each other) of its associated channel to generate its respective multi-subcarrier modulated signal 312.0, 312.1, . . . , 312.x. Each sub-carrier is modulated with the respective zero or more bits assigned to it by symbol mapper 302, which determines the Quadrature Amplitude Modulation (QAM) constellation used to modulate the sub-carrier. For example, in the case of OFDM, each sub-carrier within a symbol can be independently modulated using a QAM constellation from 1 bit per second per Hz (Binary Phase Shift Keying) up to 12 bits per second per Hz (QAM-4096). In an embodiment, MSCMs 306.0, 306.1, . . . , 306.x are Inverse Fast Fourier Transform (IFFT) modules, and the sub-carriers of the channel associated with an IFFT module correspond to the IFFT frequency bins.

Figure 4:
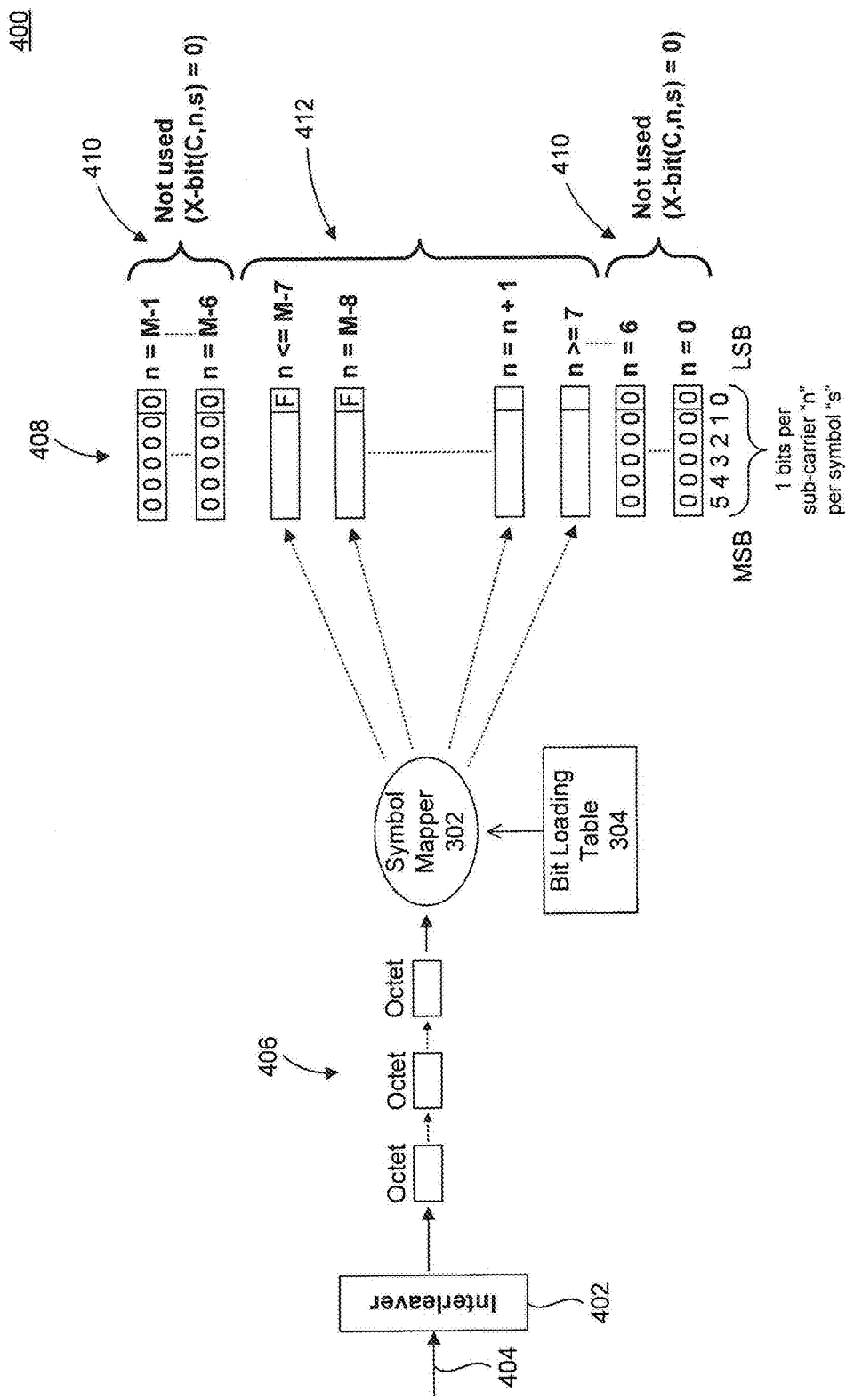
FIG. 4 illustrates another example EPoC PHY transmitter according to an embodiment.

FIG. 4 illustrates another example EPoC PHY transmitter 400 according to an embodiment. Example EPoC PHY transmitter 400 is provided for the purpose of illustration only and is not limiting of embodiments. Example EPoC PHY transmitter 400 can be located in a CLT, such as CLT 202, in a CNU, such as CNU 122 or 204, or in a CMC, such as CMC 112, for example. Example EPoC PHY transmitter 400 can be used to generate and bond multiple EPoC channels (in the upstream or downstream) to result in a single high-speed channel. As shown in FIG. 4, example EPoC PHY transmitter 400 includes, among other components, an interleaver 402, a symbol mapper 302, and a bit loading table 304.

Interleaver 402 can include a time and/or frequency interleaver. Interleaver 402 receives a MAC data bit stream 404 and interleaves it to generate an interleaved MAC data bit stream 406. In other embodiments, interleaver 402 or one or more interleavers, each associated with a respective channel, can be placed after symbol mapper 302. MAC data bit stream 406 is represented as a series of octets in FIG. 4. Symbol mapper 302 receives MAC data bit stream 406 and maps bits from MAC data bit stream 406 to a plurality of sub-carriers 408 (n=0, . . . , M−1).

As shown in FIG. 4, sub-carriers 408 can include sub-carriers that are not used (i.e., no energy), such as sub-carriers 410. For sub-carriers 410, the X-bit in bit loading table 304 is set to zero as described above and they are loaded with zeros accordingly. Sub-carriers 408 can also include used sub-carriers, such as sub-carriers 412. Sub-carriers 412 can include sub-carriers that are used for MAC data (M-bit equal to 1) and sub-carriers that are used but reserved for other types of information (e.g., pilot information) (M-bit equal to zero).

As shown in FIG. 4, symbol mapper 302 maps bits from MAC data bit stream 406 to MAC used sub-carriers having symbol bit loading greater than zero. In an embodiment, between 1 and 6 bits are loaded per sub-carrier per symbol time. However, in other embodiments, more than 6 bits can be loaded per sub-carrier. In an embodiment, consecutive bits of MAC data bit stream 406 are loaded into the same sub-carrier as long as the symbol bit loading of the sub-carrier has not been reached. When the symbol bit loading of the sub-carrier is reached, the next used sub-carrier is loaded. In another embodiment, the sub-carriers are filled in a round-robin fashion such that consecutive bits of MAC data bit stream 406 are assigned to successive used carriers, which can be part of the same or different channels.

Embodiments described above enable an EPoC PHY transmitter to communicate with one or more receivers, each of which having the ability to receive a multi-channel bonded signal (multi-channel products). In practice, however, it is anticipated that products that support only a single channel in either direction (single-channel products) will coexist with multi-channel products. For example, the initial availability of RF spectrum for EPoC services is expected to be less than or up to 192 MHz, which can be readily supported by single-channel products. As such, some cable operators may choose to provide single-channel products initially and then upgrade them as more RF spectrum becomes available. Other cable operators, however, may choose to deploy multi-channel products, and then enable more RF spectrum via management without having to replace/upgrade customer CNUs. The choice made by the cable operator for a single-channel versus a multi-channel model of CNU will be largely based on differential cost between the two different models, the cable operators cost requirements for new deployments, as well as the timeline and cost for planned cable network upgrades to make more RF spectrum available for multi-channel models of EPoC CNUs, etc.

Having two models of CNU is likely to lead to deployment scenarios where a single cable operator may have to support both single-channel CNUs and multi-channel CNUs. Due to the prohibitive cost of replacing all existing one-channel CNUs, it would be highly preferred if the cable operator need only upgrade the CLT transceiver (if needed) and continue to support its existing deployed base of one-channels CNUs while simultaneously deploying new multi-channel CNUs. Over time, the cable operate can cost-effectively alter channel provisioning (e.g. amount of RF spectrum allocated a channel), as well as upgrade/replace the existing one-channel CNUs with multi-channel CNUs, to avoid excessive upfront cost. The embodiment of FIG. 9 below describes an EPoC PHY transmitter, which can be used in a CLT, for example, to enable a cable operator to support both single-channel and multi-channel CNUs.

Figure 9:
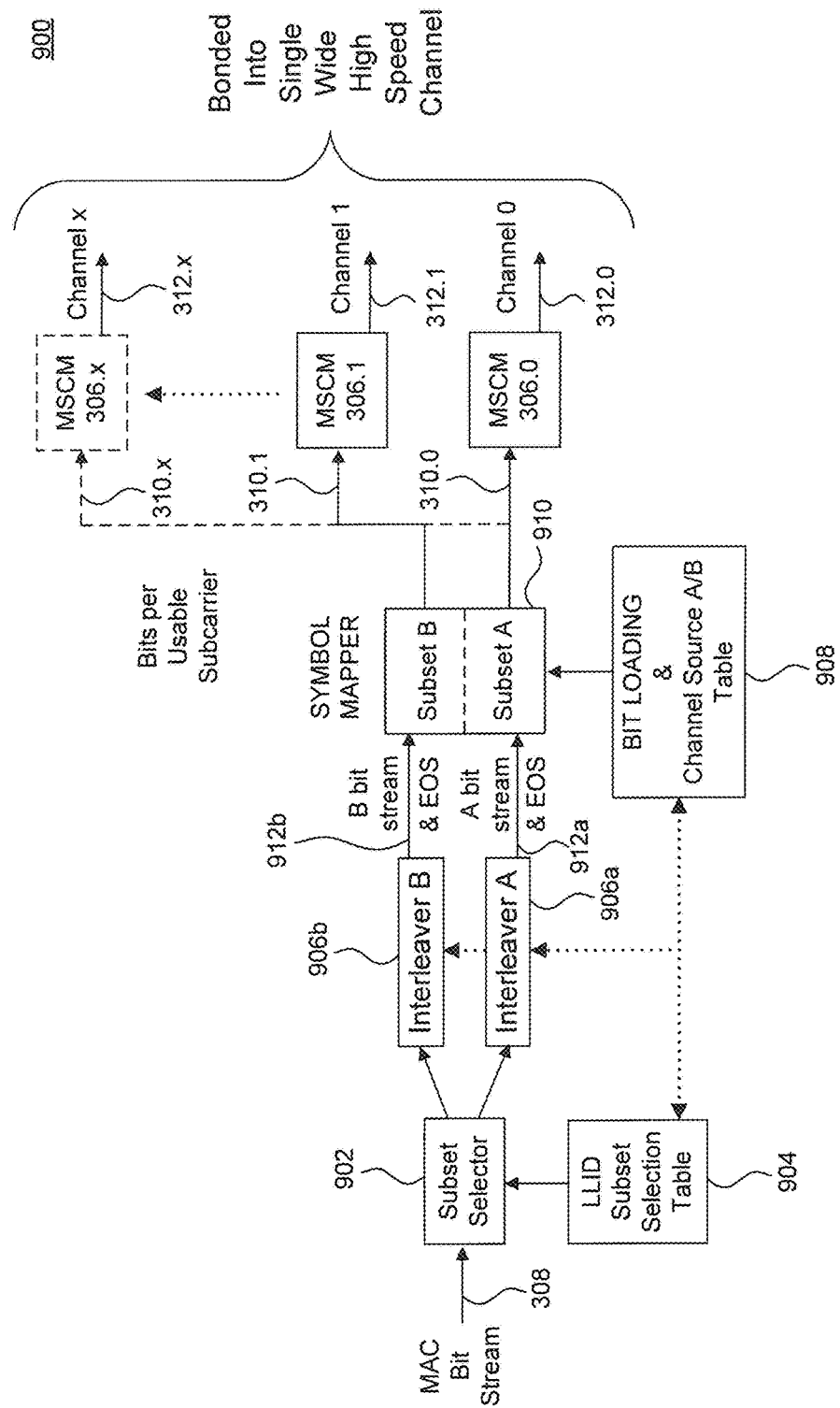
FIG. 9 illustrates another example EPoC PHY transmitter according to an embodiment.

FIG. 9 illustrates another example EPoC PHY transmitter 900 according to an embodiment. Example EPoC PHY transmitter 900 is provided for the purpose of illustration only and is not limiting of embodiments. Example EPoC PHY transmitter 900 can be located in a CLT, such as CLT 202, in a CNU, such as CNU 122 or 204, or in a CMC, such as CMC 112, for example. Example EPoC PHY transmitter 900 can be used to generate and bond multiple EPoC channels (in the upstream or downstream) to result in a single high-speed channel. Specifically, EPoC PHY transmitter 900 can be used to support single-channel receivers (e.g., CNUs that can receive a single unbonded channel) and multi-channel receivers (e.g., CNUs that can receive multiple channels simultaneously).

As shown in FIG. 9, example EPoC PHY transmitter 900 includes, among other components, a subset selector 902, a Logical Link Identifier (LLID) Subset Selection Table 904, interleavers 906a and 906b, a Bit Loading and Channel Source Table 908, a symbol mapper 910, and a plurality of MSCMs 306.0, 306.1, . . . , 306.x, which are as described above with reference to FIG. 3.

Subset selector 902 is configured to receive a MAC bit stream 308 from the MAC layer. MAC bit stream 308 includes EPON processed MAC frames that include the LLID information of their respective receiver (e.g., ONU/CNU) destinations. The LLID is assigned by the EPON MAC Multi-Point Control Protocol (MPCP) sub-layer as part of EPON Discovery and is made available to a Reconciliation Layer (RL) that sits between the MAC and PHY layers. Typically, ONUs (CNUs) are assigned one or more LLIDs in normal EPON operation. In addition there is a broadcast LLID that is received and processed by all ONUs/CNUs. There may be zero or more LLIDs assigned for multicast use, where that particular LLID is received and processed by a subset of the ONUs/CNUs. In an embodiment, MAC frames being conveyed in MAC bit stream 308 are serialized in time with intervening idling gaps inserted for rate adaptation or for link idle when the MAC has no information to transmit.

Subset selector 902 is configured to switch a MAC frame contained in bit stream 308 either to interleaver 906a or interleaver 906b based on the LLID information contained in the MAC frame. In an embodiment, subset selector 902 uses LLID Subset Selection Table 904 to determine how to switch a given MAC frame. Table 904 can be provisioned by the cable operator, during PHY auto-negotiation (PHY link establishment between CLT and CNU), and/or via EPON discovery.

In an embodiment, table 904 groups LLIDs into multiple subsets depending on the number of channels supported by their associated receivers (e.g., ONUs/CNUs) (for the purpose of illustration only, two subsets A and B are shown in FIG. 9, with subset A corresponding to single-channel receivers and subset B corresponding to multiple channel (e.g., 5-channel) receivers. Subset selector 902 thus switches a MAC frame to interleaver 906a if the MAC frame belongs to an LLID in subset A and to interleaver 9046 if the MAC frame belongs to an LLID in subset B. For example, during auto-negotiation and discovery, single-channel or 5-channel capability becomes known to the CLT for each assigned LLID. The cable operator can designate channel 0, for example, for subset A receivers (i.e., for single-channel receivers, EPoC PHY transmitter 900 transmits on channel 0 and all single-channel receivers receive only on channel 0). For subset B receivers, the cable operator can designate channels 0 through 4, for example, with each multi-channel receiver being configured to receiver channel 0 separately and channels 1 through 4 as a single bonded channel.

As would be understood by a person of skill in the art based on the teachings herein, more than two subsets can be used in other embodiments, with each subset corresponding to receivers with a given number of supported channels (e.g., subset A for single-channel receivers, subset B for two-channel receivers, subset C for three-channel receivers, etc.).

Interleavers 906a and 906b interleave their respective MAC frame bits in time and/or frequency to generate respective signals 912a and 912b. In an embodiment, signals 912a and 912b include respectively a subset A bit stream and a subset B bit stream. In another embodiment, each of interleavers 906a and 906b has knowledge of the end of MAC frame (EOF) for its respective subset (when there is no more MAC data coming from subset selector 902 for its respective subset) as well as the total bits per current symbol required by symbol mapper 908 to completely fill a symbol for its subset's channel(s). as such, additionally, signals 912a and 912b can include an End of Symbol (EOS) notification to indicate to symbol mapper 910 that there is no more MAC data coming from subset selector 902.

In another embodiment, interleavers 906a and 906b can be located after symbol mapper 910. In this arrangement, symbol mapper 910 would receive one or more subset bit streams from subset selector 902. Subset selector 902, in this embodiment, has knowledge of the EOF for the subsets as well as the total bits per current symbol required by symbol mapper 910 to completely fill a symbol for each subset's Channel(s). Subset selector 902 can assert an (EOS) notification to the symbol mapper 910 when an EOF is encountered and there is no more MAC data available for a given subset.

Symbol mapper 910 maps the subset A bit stream and the subset B bit stream contained in signals 912a and 912b respectively to the appropriate channels as designated by the cable operator, for example. In an embodiment, symbol mapper 910 uses table 908 to determine the symbol bit loading for each sub-carrier as described above. Additionally, symbol mapper 908 receives a selection signal from table 908, which determines, for each symbol, the subset (subset A or subset B) to map from. This can be based on which of the subsets has MAC data ready to transmit. Thus, the selection signal can be different from symbol to symbol.

In an embodiment, to maintain frame ordering at the receiver, when symbol mapper 910 is filling one subset, it fills in idles or padding information for all bits for all active subcarriers of the other subset. When viewed in time, each symbol either contains all idles (when the MAC has no frames to transmit for either subset) or MAC data in the channel(s) associated with Subset A (or subset B) and idles/padding in the channels (channel) associated with Subset B (or subset A). As such, subset A (single-channel) receivers receive ordered packets via channel 0 and are not aware of any other channel, while subset B (5-channel) receivers receive frames on either channel 0 or on bonded channels 1-4. While subset B receivers receive frames on bonded channels 1-4, channel 0 is idle and will not affect the operation of subset A receivers.

In another embodiment, EPoC PHY transmitter 900 associates a receiver-ordering sequence identifier for each EPON processed MAC frame. The sequence has a different sequential value for each frame that has been received by the MAC. This sequence identifier could be represented by an N*8-bit unsigned integer (e.g. 8-bit, 16-bit, etc.) that increments by 1 for each frame, then rolls over from maximum value to 0, etc. The sequence identifier may also be represented by a timestamp, e.g., a 32-bit or larger integer, with a sufficiently precise time period such that no two back-to-back EPON processed MAC frames would receive the same time stamp value. As each MAC frame is now identified with ordering information, symbol mapper 910, as described earlier, can now fill a symbol with bit stream information for both Subset A and Subset B in the same symbol. Each Subset A single-channel receiver, receiving only Channel 0, can be configured to not process the sequence identifier, and to only process the MAC frame as received. Each Subset B multi-channel CNU can potentially receive the start of two or more MAC frames on both channel 0 and bonded channels 1-4 in the same symbol. A multi-channel CNU would examine the sequence identifier so that it maintains packet ordering for MAC frames delivered to the higher MAC layer (e.g., buffering/playout management). With the inclusion of packet ordering information associated with each processed MAC frame in the downstream transmission, original MAC frame ordering can be recovered in the receiver's multi-channel receiving process when each modulation symbol contains information for channel 0 and bonded channels 1-4. The net effect of this mechanism is to increase the data carrying efficiency of each transmitted symbol.

In an embodiment, a sequence identifying relationship can be incorporated as part of a PHY marker or pointer arrangement, where ordering information is derived from either the marker value or information associated directly or indirectly with a marker or pointer. This does not preclude either the inline (in-band) placement of such information within the same bit stream that contains the MAC data, or for a given channel, bonded or otherwise, reserving one or more subcarriers for out-of-band placement of sequencing and/or identification information that is inserted by symbol mapper 910 and recovered by the receiver for the purposes of frame identification, alignment, and/or ordering.

In another embodiment, burst mode operation can be supported using EPoC PHY transmitter 900. In the upstream, one-channel CNUs can use only channel 0 and multi-channel CNUs can use all available channels since the CLT receiver is aware of whether it is a one-channel or multi-channel transmission. In this embodiment, a CNU can transmit a burst to the CLT that contains one or MAC frames. Order of transmission of MAC frames from the CNU to the CLT is preserved in the upstream direction in this arrangement. In the downstream, a downstream burst mode operation can control the number of symbols per burst as well as turn off the downstream channel RF transmitter based on a duplexing control function.

As would be understood by a person of skill in the art based on the teachings herein, embodiments can also be used in a system that employs OFDMA in the upstream direction. In such embodiment, any given upstream symbol may be comprised of simultaneous symbol-aligned transmissions from more than one CNU, sharing a non-overlapping subset of subcarriers selected from within the number of channels supported and provisioned for operation.

Figure 10:
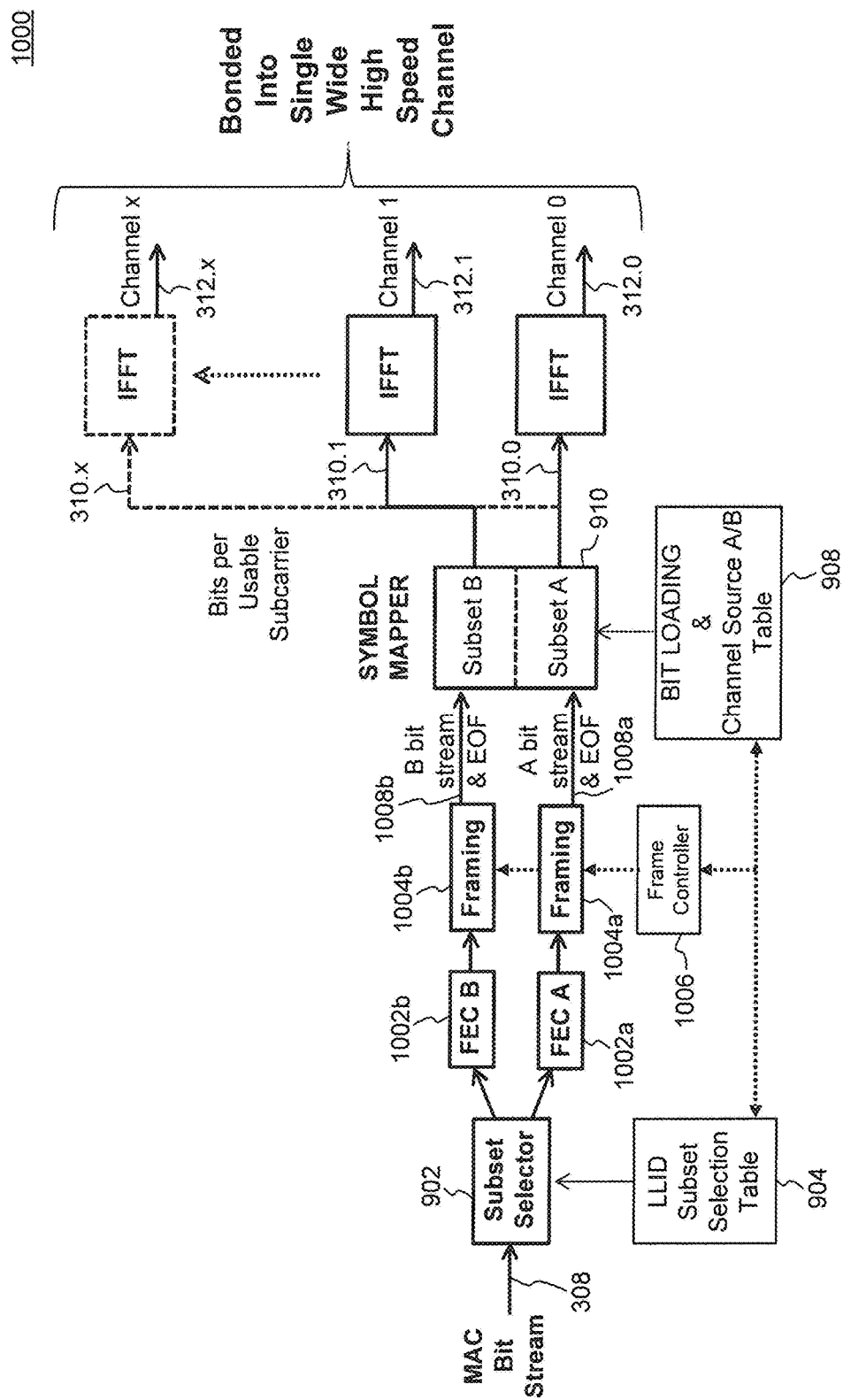
FIG. 10 illustrates another example EPoC PHY transmitter according to an embodiment.

FIG. 10 illustrates another example EPoC PHY transmitter 1000 according to an embodiment. Example EPoC PHY transmitter 1000 is provided for the purpose of illustration only and is not limiting of embodiments. Example EPoC PHY transmitter 1000 can be located in a CLT, such as CLT 202, in a CNU, such as CNU 122 or 204, or in a CMC, such as CMC 112, for example. Example EPoC PHY transmitter 1000 can be used to generate and bond multiple EPoC channels (in the upstream or downstream) to result in a single high-speed channel.

As shown in FIG. 10, example EPoC PHY transmitter 900 includes similar components as EPoC PHY transmitter 900 but replaces the interleaving process between subset selector 902 and symbol mapper 910 with FEC and framing processes. For this purpose, instead of interleavers 906a and 906b, example EPoC PHY transmitter 1000 includes first and second Forward Error Correction (FEC) modules 1002a and 1002b, first and second framing modules 1004a and 1004b, and a frame controller 1006. Frame controller 1006 controls the framing performed by framing modules 1004a and 1004b and has access to Bit Loading and Channel Source Table 908.

As described above with reference to example EPoC PHY transmitter 900, subset selector 902 is configured to switch a MAC frame contained in bit stream 308 either to interleaver 906a or interleaver 906b based on the LLID information contained in the MAC frame.

FEC modules 1002a and 1002b receive respective bit streams from subset selector 902 and perform FEC encoding on their respective bit streams to generate respective FEC outputs. In an embodiment, the FEC encoding process includes receiving a bit stream of information, performing a blocking function on the bit stream of information to generate an information block, computing a parity code over the information block, and producing an output bit stream composed of the original information block and the added parity information. The combined information block plus the added parity information is referred to as a codeword. FEC output codeword sizes are dependent on the specific FEC algorithm and may be of fixed sized or may be shortened. The specific FEC encoding algorithm used by FEC module 1002a may be the same or different than that used by FEC module 1002b.

Framing modules 1004a and 1004b receive respectively FEC outputs of FEC modules 1002a and 1002b. In an embodiment, framing modules 1004a and 1004b have knowledge of the codeword sizes of the codewords contained in the respective FEC outputs that they receive. In an embodiment, framing modules 1004a and 1004b are each configured to insert a marker into their respective received FEC output. The marker may be of a static format or may encode additional information that can be used to determine the FEC encoding of one or more codewords that follow the marker in the respective FEC output. For the purposes of this description, the information in an FEC output from the start of one marker to the start of the next marker is referred to as codeword frame. The sizes of codeword frames being output by framing modules 1004a and 1004b can be the same or different. As known in the art, MAC frames are either aligned such that the start of a MAC frame is aligned to the start of the information block or MAC frames are processed by a line encoding, such as a well-known 64b/66b encoding, that provides additional information to determine start and end of MAC frame, as well as line encoding blocking.

In an embodiment, each of framing modules 1004a and 1004b has knowledge of the end of codeword as well as the total bits per current symbol required by symbol mapper 910 to complete fill a symbol for its subset's channel(s). As described above, the bit loading and/or Channel A/B input selection can be different from symbol to symbol. Either of framing modules 1004a and 1004b can assert an End Of Frame (EOF) notification to symbol mapper 910 when there are no more codeword frames available for the respective subset channel.

In one embodiment, to maintain MAC frame ordering at the receiver, when symbol mapper 910 is filling one subset with one or more codeword frames, it fills in idles or padding information for all bits for all active subcarriers in the other subset. When viewed in time, each symbol either contains all idles (when the MAC has no frames to transmit for either subset), or MAC data in the channel(s) associated with Subset A (or subset B) and idles/padding in the channels associated with Subset B (or subset A).

In another embodiment, and as also described above, EPoC PHY transmitter 1000 associates a receiver-ordering sequence identifier for each EPON processed MAC frame. As each MAC frame is now identified with ordering information, symbol mapper 910 can now fill a symbol with respective frame information for both Subset A and Subset B in the same symbol. Each Subset A single-channel CNU receiving only channel 0, for example, can be aware to not process the sequencing identifier, and only processes the frame and the enclosed FEC codewords. The resulting stream of bits as presented in each information blocks is further decoded into one or more serialized MAC frames. A multi-channel CNU, receiving bonded channels 1-5, for example, can perform a similar process of receiving codeword frames and processing to decode one or more serialized MAC frames. Due to the nature of encoding MAC frames in FEC codewords, each FEC codeword may contain zero or more MAC frames depending on how each MAC frame aligned with the respective FEC encoding process at the CLT transmitter. With this arrangement, a single-channel CNU receiving only channel 0, for example, can receive the start of more than one MAC frame within a processed information block. And each Subset B multi-channel CNU can also receive the start of zero or more MAC frames on channel 0 and as well as on bonded channels 1-5 in the same symbol. A multi-channel CNU can examine all sequence identifiers so that it maintains packet ordering for MAC frames delivered to the higher MAC layer (i.e., buffering/playout management).

In an alternative embodiment, the EOF from framing modules 1004a and 1004b to symbol mapper 910 is not used and symbol mapper 910 simultaneously fills the symbol for both channel 0 and bonded channels 1-5 as a continuous stream of information without aligning a start of codeword frame to the respective channel symbol start location. For both a single-channel CNU as well as a multi-channel CNU, the frame markers present in the bit stream are used to decode the start and end of each respective FEC codeword. As described previously, the start of codeword frame identification can be incorporated as part of a PHY marker or pointer arrangement, where ordering information is derived from either the frame marker value or information associated directly or indirectly with a marker or pointer using an in-band or out-of-band arrangement.

Figure 5:
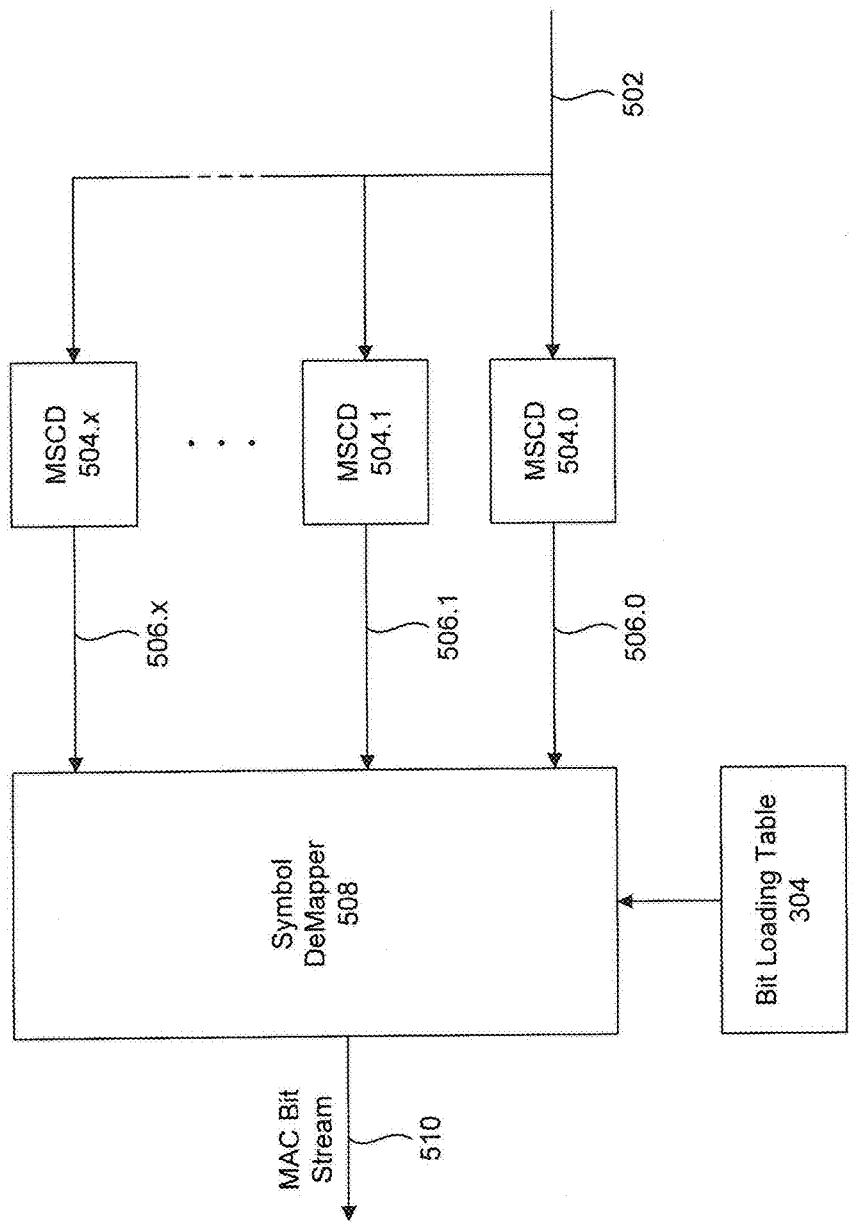
FIG. 5 illustrates an example EPoC PHY receiver according to an embodiment.

FIG. 5 illustrates an example EPoC PHY receiver 500 according to an embodiment. Example EPoC PHY receiver 500 is provided for the purpose of illustration only and is not limiting of embodiments. Example EPoC PHY receiver 500 can be located in a CLT, such as CLT 202, in a CNU, such as CNU 122 or 204, or in a CMC, such as CMC 112, for example. Example EPoC PHY receiver 500 can be used, in the upstream or the downstream, to receive from a counterpart EPoC PHY transmitter (e.g., as described above in FIGS. 3 and 4) a single multi-channel bonded signal 502, to un-bond multiple EPoC channels 506.0, . . . , 506.x contained in signal 502, and to assemble a MAC data bit stream 510 being conveyed by the multiple EPoC channels 506.0, . . . , 506.x.

As shown in FIG. 5, example EPoC PHY receiver 500 includes, among other components, a bit loading table 304, a symbol demapper 508, and a plurality of multi-subcarrier demodulators (MSCDs) 504.0, . . . , 504.x. Bit loading table 304 can be as described above with respect to FIG. 3. Specifically, bit loading table 304 contains the same symbol bit loading per sub-carrier information as used by the EPoC PHY transmitter that transmitted signal 502 to EPoC PHY receiver 500.

MSCDs 504.0, 504.1, . . . , 504.x are associated with respective channels (or bands) 0, 1, . . . , x, each formed by a collection (subset) of sub-carriers of a plurality of available sub-carriers. In an embodiment, the collections of sub-carriers that respectively form the channels 0, 1, . . . , x are non-overlapping and can be adjacent or separated in frequency. In another embodiment, different channels can include overlapping sub-carriers so long as they are not used by both channels in a same symbol (i.e., the sub-carrier is used for one channel and turned off for all other channels). In an embodiment, each channel has a maximum usable RF spectral bandwidth (e.g., 192 MHz) and can be positioned independently in frequency from the other channels. In an embodiment, the channels 0, 1, . . . , x of MSCDs 504.0, 504.1, . . . , 504.x correspond to channels used by the EPoC PHY transmitter to form signal 502.

Each of MSCDs 504.0, 504.1, . . . , 504.x is configured to demodulate, in each symbol time, portions of signal 502 that correspond to its associated channel's sub-carriers to generate a channel bit stream 506. In an embodiment, each of MSCDs 504.0, 504.1, . . . , 504.x demodulates its associated channel's sub-carriers in parallel each in accordance with a respective QAM constellation. The respective QAM constellations for the sub-carriers correspond to the symbol bit loading of the sub-carriers and are configured into MSCDs 504.0, 504.1, . . . , 504.x. In another embodiment, MSCDs 504.0, 504.1, . . . , 504.x include Fast Fourier Transform (FFT) modules having frequency bins configured according to the sub-carriers of their associated channels.

Channel bit streams 506.0, 506.1, . . . , 506.x are provided simultaneously to symbol demapper 508. Symbol demapper 508 uses bit loading table 304 to generate MAC bit stream 510 from channel bit streams 506.0, 506.1, . . . , 506.x. Specifically, for each channel bit stream 506, symbol demapper 508 uses bit loading table 304 to identify the bits corresponding to each sub-carrier of the channel. Then, symbol demapper 508 uses a demapping function (which is the reverse of the mapping function performed by the symbol mapper of the EPoC PHY transmitter) to generate MAC data bit stream 510. For example, if the symbol mapper loaded the channels one after the other, one sub-carrier at a time, then symbol demapper 508 generates MAC data bit stream 510 by appending, one after the other, channel bit streams 506.0, 506.1, . . . , 506.x. Alternatively, if the symbol mapper interleaved the bits across channels and/or sub-carriers within a channel, then symbol demapper 508 applies corresponding de-interleaving to generate MAC data bit stream 510. In an embodiment, MAC data bit stream 510 is a serial bit stream.

Figure 6:
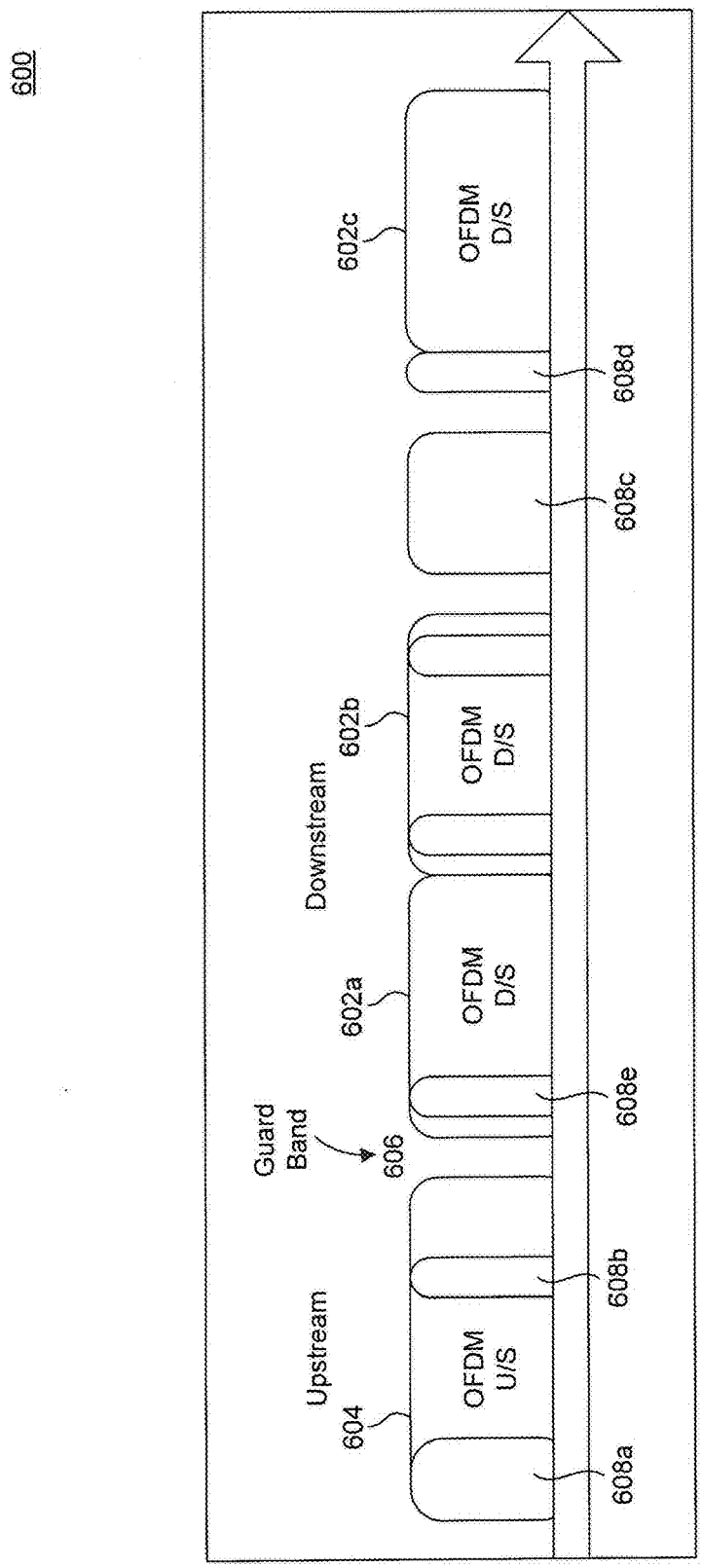
FIG. 6 illustrates an example EPoC bandwidth allocation that can be enabled using embodiments.

FIG. 6 illustrates an example EPoC bandwidth allocation 600 that can be enabled using embodiments. Example EPoC bandwidth allocation 600 is provided for the purpose of illustration only and is not limiting of embodiments. As would be understood by a person of skill in the art based on the teachings herein, other EPoC bandwidth allocations can also be enabled using embodiments.

As shown in FIG. 6, EPoC bandwidth allocation 600 includes an upstream RF band 604, which is configured/tailored to coexist with interleaved existing services that occupy bands 608a and 608b. The downstream spectrum includes several channels 602a, 602b, and 602c, which are located in different areas of the overall spectrum. A guard band 606 can separate upstream band 604 and downstream channel 602a.

Downstream channels 602a, 602b, and 602c are adjacent as in the case of channels 602a and 602b or separated in frequency as in the case of channel 602c relative to channels 602a and 602b. Existing services that occupy bands 608c and 608b are interleaved between downstream channels 602b and 602c, and within channels 602a and 602b, certain sub-carriers are nulled to accommodate existing services. For example, an existing service that occupies a band 608e is enveloped by channel 602a.

Figure 7:
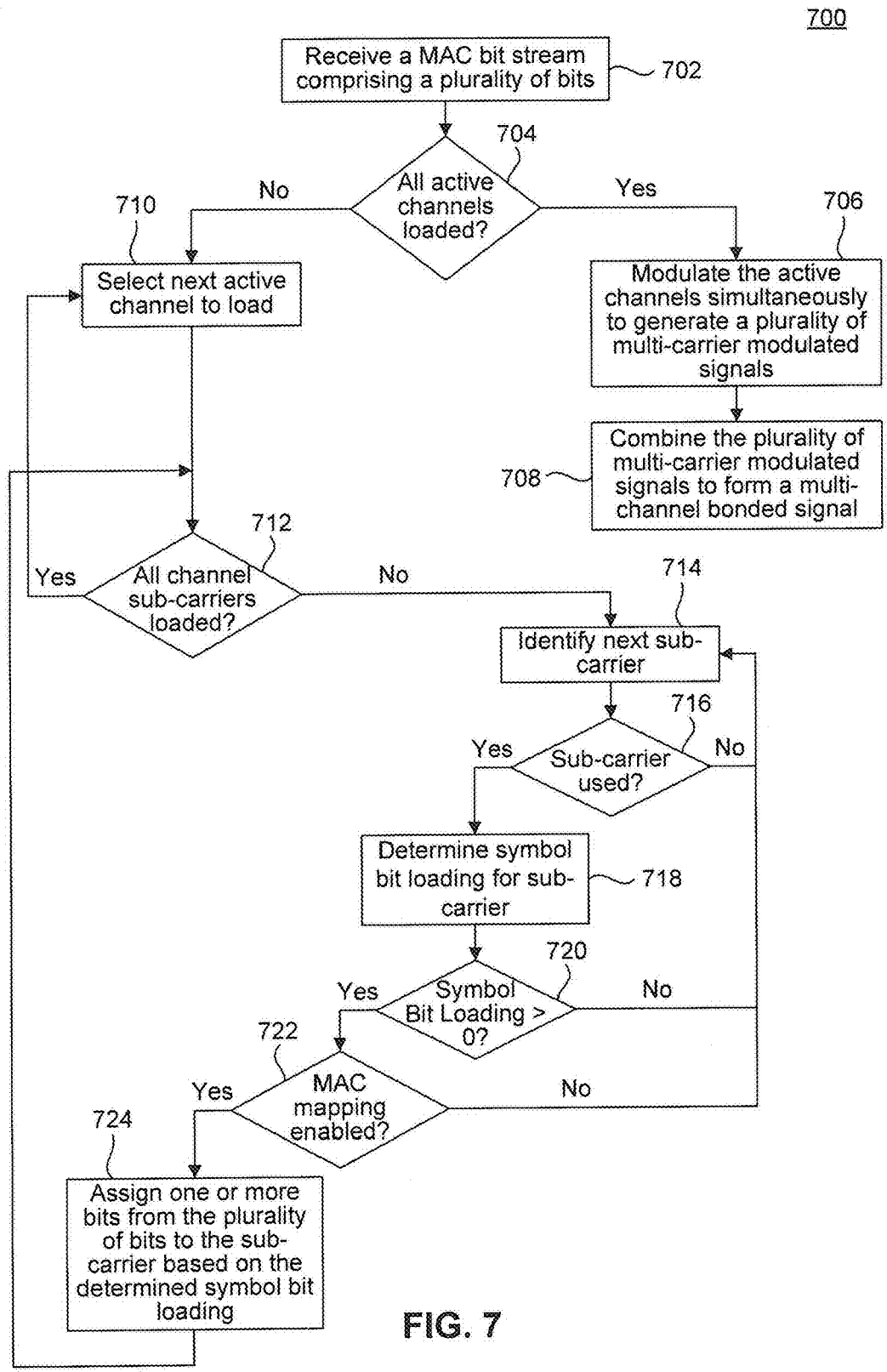
FIG. 7 illustrates an example process according to an embodiment.

FIG. 7 illustrates an example process 700 according to an embodiment. Example process 700 is provided for the purpose of illustration only and is not limiting of embodiments. Example process 700 can be used by a CLT, such as CLT 202, by a CNU, such as CNU 122 or 204, or by a CMC, such as CMC 112, for example, in order to generate and bond multiple EPoC channels (in the upstream or downstream) to result in a single high-speed channel.

As shown in FIG. 7, process 700 begins in step 702, which includes receiving a MAC bit stream comprising a plurality of bits. The MAC bit stream can be a serial bit stream. Subsequently, process 700 proceeds to step 704, which includes determining whether or not all active channels have been loaded (filled with respective bits). In an embodiment, the active channels can include (upstream or downstream) channels that have been enabled by the cable operator for use.

If all active channels have been loaded, process 700 proceeds to step 706, which includes modulating the active channels simultaneously to generate a plurality of multi-subcarrier modulated signals. In an embodiment, each active channel is modulated using a respective MSCM as described above in FIG. 3. Then, in step 708, process 700 includes combining the plurality of multi-carrier modulated signals to form a multi-channel bonded signal.

If it is determined that not all active channels have been loaded in step 704, process 700 proceeds to step 710, which includes selecting the next active channel to load. Then, process 700 proceeds to step 712, which includes determining whether or not all sub-carriers of the selected channel have been loaded. If yes, then process 700 returns to step 710. Otherwise, process 700 proceeds to step 714, which includes identifying the next sub-carrier to load, and then to step 716.

In step 716, process 700 includes determining whether or not the identified sub-carrier is used. In an embodiment, step 716 includes examining a bit loading table to determine whether the sub-carrier is configured for use or not (e.g., turned off). If the sub-carrier is not used, process 700 returns to step 714. Otherwise, process 700 proceeds to step 718, which includes determining a symbol bit loading for the sub-carrier. In an embodiment, the symbol bit loading is determined from a bit loading table. Subsequently, process 700 proceeds to step 720.

In step 720, process 700 includes determining whether or not the symbol bit loading for the sub-carrier is greater than zero. If not (i.e., symbol bit loading equal to zero), then the sub-carrier is configured to carry un-modulated energy and process 700 returns to step 714. Otherwise, process 700 proceeds to step 722.

In step 722, process 700 includes determining whether or not MAC mapping is enabled for the sub-carrier. If not (i.e., the sub-carrier is not used to transport MAC data), then process 700 returns to step 714. Otherwise, process 700 proceeds to step 724, which includes assigning one or more bits from the plurality of bits of the MAC bit stream to the sub-carrier, based on the symbol bit loading of the sub-carrier determined in step 718. Process 700 then return to step 712 to determine whether or not all sub-carriers of the channel have been loaded.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. An Ethernet Passive Optical Network over Coax (EPoC) physical layer (PHY) transmitter, comprising:
   a subset selector configured to receive a Medium Access Control (MAC) bit stream and to determine whether a MAC frame of the MAC bit stream belongs to a first subset or a second subset based on a logical identifier associated with the MAC frame, wherein the first subset corresponds to single-channel Coaxial Network Units (CNUs) and the second subset corresponds to multi-channel CNUs; and
   a symbol mapper configured to map the MAC frame to a single unbonded channel when the MAC frame belongs to the first subset and to multiple bonded channels when the MAC frame belongs to the second subset,
   wherein the symbol mapper is further configured to load the single unbonded channel with at least a portion of the MAC frame and load the multiple bonded channels with all idles or padding information when the MAC frame belongs to the first subset, and
   wherein the single unbounded channel and the multiple bonded channels are combined for transmission over an EPOC network.

2. The EPoC PHY transmitter of claim 1, wherein the logical identifier includes an Ethernet Passive Optical Network (EPON) Logical Link Identifier (LLID).

3. The EPoC PHY transmitter of claim 1, further comprising:
   a bit loading table containing respective symbol bit loading for each of a plurality of sub-carriers.

4. The EPoC PHY transmitter of claim 3, wherein the symbol mapper is configured to map the MAC frame to the multiple bonded channels when the MAC frame belongs to the second subset by assigning, to each sub-carrier of the plurality of sub-carriers, zero or more bits of the MAC bit stream based on the respective symbol bit loading for a sub-carrier indicated in the bit loading table.

5. The EPoC PHY transmitter of claim 4, further comprising:
   a plurality of multi-subcarrier modulators associated respectively with the multiple bonded channels, the multiple bonded channels formed by respective subsets of the plurality of sub-carriers, configured to modulate the multiple bonded channels respectively to generate a plurality of respective multi-subcarrier modulated signals.

6. The EPoC PHY transmitter of claim 5, wherein at least one of the plurality of multi-subcarrier modulators is configured to simultaneously modulate sub-carriers of its associated channel to generate its respective multi-subcarrier modulated signal.

7. The EPoC PHY transmitter of claim 5, wherein at least one of the plurality of multi-subcarrier modulators is further configured to independently modulate each sub-carrier of its associated channel with the respective zero or more bits assigned to the sub-carrier.

8. The EPoC PHY transmitter of claim 7, wherein the at least one of the plurality of multi-subcarrier modulators is further configured to modulate each sub-carrier of its associated channel using a respective Quadrature Amplitude Modulation (QAM) constellation.

9. The EPoC PHY transmitter of claim 8, wherein the respective QAM constellation is configured to have a symbol rate between 1 bit per second per Hz and 12 bits per second per Hz.

10. The EPoC PHY transmitter of claim 5, further comprising:
    a controller configured to adjust the respective subset of the plurality of sub-carriers for at least one channel of the multiple bonded channels.

11. The EPoC PHY transmitter of claim 5, further comprising:
    a controller configured to adapt the respective symbol bit loading for at least one sub-carrier of the plurality of sub-carriers based on a communication channel condition.

12. The EPoC PHY transmitter of claim 5, wherein the plurality of multi-subcarrier modulators are configured to simultaneously modulate the multiple bonded channels respectively to generate the plurality of respective multi-subcarrier modulated signals, the EPoC PHY transmitter further comprising:
    a combiner configured to combine the plurality of respective multi-subcarrier modulated signals.

13. A method for channel bonding in an Ethernet Passive Optical Network over Coax (EPoC) transmitter, the method comprising:
    receiving a Medium Access Control (MAC) bit stream;
    determining whether a MAC frame of the MAC bit stream belongs to a first subset or a second subset based on a logical identifier associated with the MAC frame, wherein the first subset corresponds to single-channel Coaxial Network Units (CNUs) and the second subset corresponds to multi-channel CNUs;
    mapping the MAC frame to a single unbonded channel and loading the multiple bonded channels with all idles or padding information when the MAC frame belongs to the first subset;
    mapping the MAC frame to multiple bonded channels and loading the single unbounded channel with all idles or padding information when the MAC frame belongs to the second subset; and
    combining the single unbounded channel and the multiple bonded channels for transmission over an EPoC network.

14. The method of claim 13, wherein mapping the MAC frame to the multiple bonded channels when the MAC frame belongs to the second subset comprises:
    for each sub-carrier of a plurality of sub-carriers,
        determining a symbol bit loading for the each sub-carrier; and assigning zero or more bits of the MAC bit stream to the each sub-carrier based on the determined symbol bit loading; and modulating the multiple bonded channels, the multiple bonded channels formed by respective subsets of the plurality of sub-carriers, to generate respective multi-subcarrier modulated signals.

15. The method of claim 14, wherein modulating the multiple bonded channels comprises:

for each channel of the multiple bonded channels, simultaneously modulating independently each sub-carrier of the each channel with the zero or more bits assigned to the each sub-carrier.

16. The method of claim 14, wherein the MAC bit stream includes first and second consecutive bits, the method further comprising:

assigning the first bit to a first sub-carrier associated with a first channel of the multiple bonded channels and the second bit to a second sub-carrier associated with the first channel.

17. An Ethernet Passive Optical Network over Coax (EPoC) physical layer (PHY) transmitter, comprising:

a subset selector configured to receive a Medium Access Control (MAC) bit stream and to determine whether a MAC frame of the MAC bit stream belongs to a first subset or a second subset based on a logical identifier associated with the MAC frame, wherein the first subset corresponds to single-channel Coaxial Network Units (CNUs) and the second subset corresponds to multi-channel CNUs; and a symbol mapper configured to map the MAC frame to a single unbonded channel when the MAC frame belongs to the first subset and to multiple bonded channels when the MAC frame belongs to the second subset, wherein the symbol mapper is further configured to load the single unbonded channel with at least a portion of the MAC frame and load the multiple bonded channels with all idles or padding information when the MAC frame belongs to the first subset and wherein the symbol mapper is further configured to load the multiple bonded channels with at least a portion of the MAC frame and load the single unbonded channel with all idles or padding information when the MAC frame belongs to the second subset; and wherein the single unbounded channel and the multiple bonded channels are combined for transmission over an EPOC network.

18. The EPoC PHY transmitter of claim 17, wherein the logical identifier includes an Ethernet Passive Optical Network (EPON) Logical Link Identifier (LLID).

* * * * *